United States Patent
Zoppas et al.

(10) Patent No.: US 11,713,230 B2
(45) Date of Patent: Aug. 1, 2023

(54) APPARATUS FOR HOT FILLING CONTAINERS

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Matteo Zoppas, Conegliano (IT); Laurent Sigler, Boust (FR); Glauco Morini, Felino (IT); Massimo Cabrini, Parma (IT); Benedetta Zancan, Treviso (IT); Giada Peruzzo, Villorba (IT); Dino Enrico Zanette, Godega di Sant'Urbano (IT); Renato Le Brun, Parma (IT)

(73) Assignee: S.I.P.A SOCIETA' INDUSTRIALIZZAZIONE PROGETTAZIONE E AUTOMAZIONE S.P.A, Vittorio Veneto (IT)

( * ) Notice: Subject to any disclaimer, the term of this patent is extended or adjusted under 35 U.S.C. 154(b) by 685 days.

(21) Appl. No.: 16/342,799

(22) PCT Filed: Oct. 20, 2017

(86) PCT No.: PCT/EP2017/076913
§ 371 (c)(1),
(2) Date: Apr. 17, 2019

(87) PCT Pub. No.: WO2018/073442
PCT Pub. Date: Apr. 26, 2018

(65) Prior Publication Data
US 2020/0055716 A1    Feb. 20, 2020

(30) Foreign Application Priority Data

Oct. 21, 2016  (IT) .................. 102016000106446

(51) Int. Cl.
*B67C 3/14*  (2006.01)
*B29C 49/42* (2006.01)
(Continued)

(52) U.S. Cl.
CPC ............ *B67C 3/14* (2013.01); *B29C 49/4273* (2013.01); *B67C 3/242* (2013.01);
(Continued)

(58) Field of Classification Search
CPC .. B67C 3/14; B67C 3/242; B67C 3/45; B67C 3/007; B67C 2003/226; B29C 49/4273; B29K 2067/003; B29L 2031/7158
(Continued)

(56) References Cited

U.S. PATENT DOCUMENTS 6,298,638 B1 * 10/2001 Bettle .................... B65B 3/022
                                                          53/284.5
9,028,739 B2    5/2015 Parrinello et al.
(Continued)

FOREIGN PATENT DOCUMENTS

JP    2004507405 A    3/2004
JP    2014128981 A    7/2014

OTHER PUBLICATIONS

Japanese Office Action dated Oct. 26, 2021—JP appln No. JP2018559368A, filed—May 10, 2017; Publication No. JP2019520600A, published—Jul. 18, 2019; 2 pages.
(Continued)

*Primary Examiner* — Valentin Neacsu
*Assistant Examiner* — Mary C Hibbert-Copeland
(74) *Attorney, Agent, or Firm* — Amster Rothstein & Ebenstein LLP

(57) ABSTRACT

An apparatus for hot or warm filling comprising a compression machine configured to apply an axial compression force to a collapsible thermoplastic container for liquids. The
(Continued)

compression machine includes a lower body having a surface designed to be a resting surface for the base of the container; at least one upper body designed to contact a portion of the container above the peripheral groove, so that the container can be held in an upright position by the at least one lower body and the at least one upper body; actuating means for actuating the at least one lower body and/or the at least one upper body in order to apply said axial compression force, acting along a direction parallel to the longitudinal axis of the container, in order to make the proximal straight side to come into contact with the distal straight side, thus reducing the internal volume of the container.

16 Claims, 15 Drawing Sheets

(51) Int. Cl.
  *B67C 3/24* (2006.01)
  *B29K 67/00* (2006.01)
  *B29L 31/00* (2006.01)
  *B67C 3/22* (2006.01)

(52) U.S. Cl.
  CPC . *B29K 2067/003* (2013.01); *B29L 2031/7158* (2013.01); *B67C 2003/226* (2013.01)

(58) Field of Classification Search
  USPC .......................................................... 53/440
  See application file for complete search history.

(56) References Cited

U.S. PATENT DOCUMENTS

| | | | | |
|---|---|---|---|---|
| 2007/0051073 A1* | 3/2007 | Kelley | ................. | B65D 1/0246 53/440 |
| 2015/0284128 A1* | 10/2015 | Kelley | ................... | B65B 63/08 215/44 |
| 2016/0152457 A1* | 6/2016 | Godet | .................... | B67C 3/007 53/440 |
| 2017/0217659 A1* | 8/2017 | Zancan | ................ | B65D 1/0246 |

OTHER PUBLICATIONS

Japanese Office Action dated Oct. 26, 2021 of JP Application No. JP2019520600A, filed—Oct. 20, 2017; JP Publication No. JP2019532879A, published Nov. 14, 2019; 2 pages.

* cited by examiner

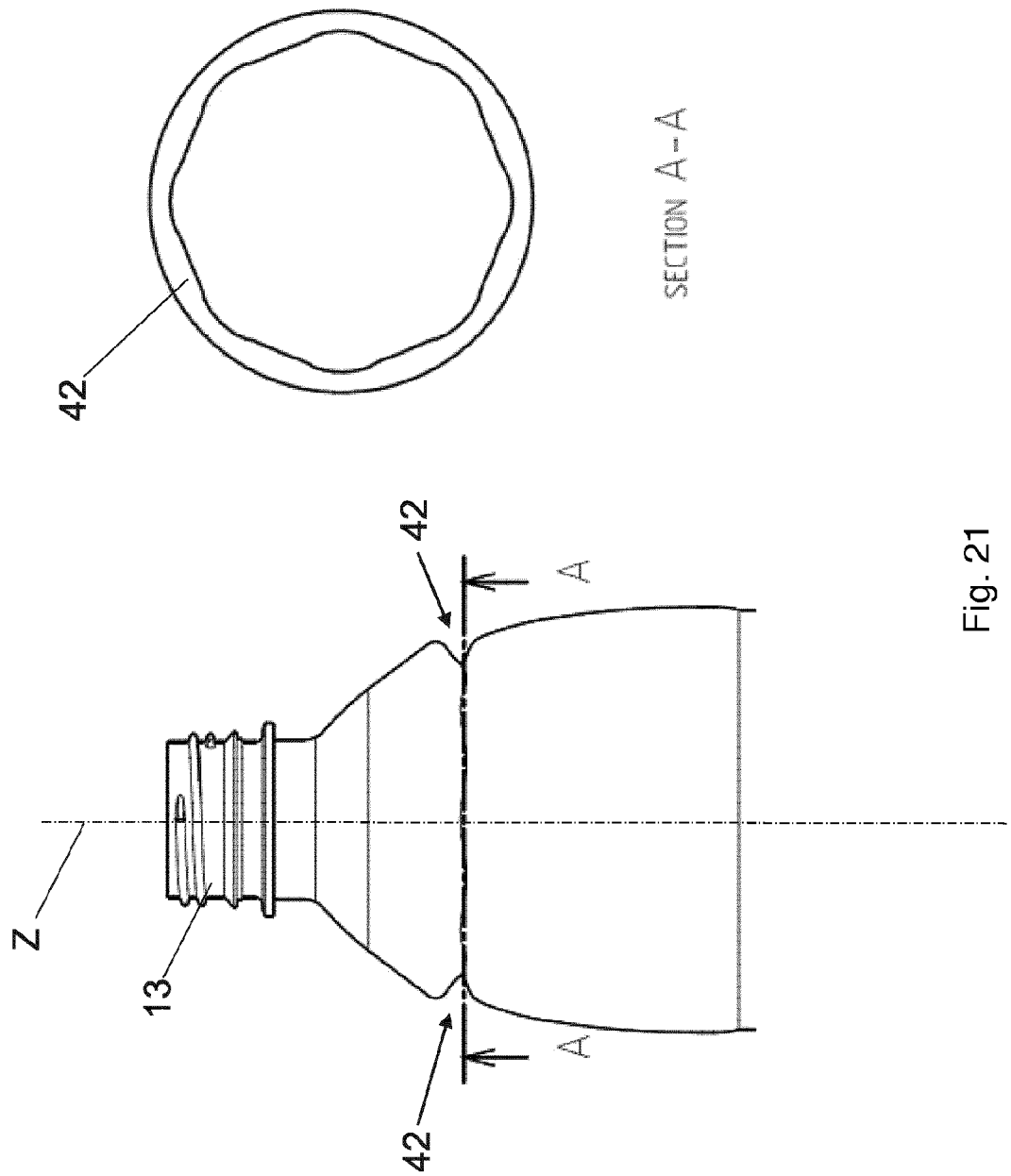

APPARATUS FOR HOT FILLING CONTAINERS

CROSS-REFERENCE TO RELATED APPLICATIONS

This application claims priority to PCT application no. PCT/EP2017/076913, filed Oct. 20, 2017, which claims priority to Italian application no. 102016000106446, filed Oct. 21, 2016, the contents of which are incorporated by reference in their entireties.

FIELD OF THE INVENTION

The present invention relates to an apparatus and a process for plastic containers which are designed to be filled with a liquid at temperatures above ambient temperature, in particular thermoplastic bottles designed for hot or warm filling.

STATE OF THE ART

The hot filling and the warm filling processes are well known in the food and beverage industry. In such processes, containers are filled with a content which is at a relatively high temperature. For example, in a warm filling process, bottles are filled with a liquid which is typically at a temperature between 60 and 80° C., while in a hot filling process bottles are filled with a liquid which is typically at a temperature between 80 and 92° C. After the filling operation, bottles are capped and tilted so that heat sterilizes the bottle and the cap. Bottles are then cooled down. The warm or hot liquid generates a vacuum when it cools down. The vacuum pressure is typically related to the reduction of the liquid temperature. This vacuum condition must be compensated in order to avoid deformation or shrinkage of the bottle. This issue is typical for bottles made of plastic material, such as Polyethylene terephthalate (PET).

Therefore, warm- and hot-fill bottles most commonly have the so-called vacuum panels that reinforce the bottle to avoid its undesired deformation. A drawback of this solution is that a large amount of plastic material is required for the production of the bottles.

Recently, an alternative solution has been proposed, wherein bottles for hot- or warm-filling are provided with a peripheral groove designed to collapse on itself when an axial compression force is applied to the bottle. Despite their advantages, the effective exploitation of such bottles is not straightforward, in particular when the mass production requirements are to be met. Indeed, it is not trivial to determine when, how and under which process conditions such compression force should be applied.

SUMMARY OF THE INVENTION

An object of the present invention is to provide an apparatus comprising a machine which applies a compression force to bottles designed for a hot or warm filling process, in particular to bottles provided with a peripheral groove which collapses, or closes, on itself when a compression force is applied to the bottle.

The above mentioned apparatus, or production plant, is for a hot- or warm-filling process.

Another object of the present invention is to provide such an apparatus and/or such a machine which are compact, highly efficient, and cost-effective.

Another object of the present invention is to provide an efficient process, in particular a hot- or warm-filling process, comprising a step of applying such a compression force to said bottles.

The present invention achieves at least one of the above mentioned objects by means of an apparatus for hot filling or warm filling comprising
a blowing machine, a filling machine, a capping machine, a tilting machine, a cooling tunnel,
wherein there is provided a compression machine configured to apply an axial compression force to a collapsible thermoplastic container along a longitudinal axis thereof,
   wherein said compression machine is positioned between the blowing machine and the filling machine or between the filling machine and the capping machine,
   or wherein the filling machine is also said compression machine, i.e. is configured to apply said axial compression force;
   or wherein the capping machine is also said compression machine, i.e. is configured to apply said axial compression force;
wherein the collapsible thermoplastic container is designed for a hot filling or warm filling process and comprises:
   a body provided with a shoulder,
   a neck, provided with a circular upper end defining an opening at a first side of the body, and with a neck ring,
   a base, defining a base plane at a second side of the body opposite to the first side,
   the body having a peripheral groove, between the neck and the middle of the container along the longitudinal axis,
   comprising a first side, proximal to the neck, and a second side, distal from the neck,
   whereby the first side comes into contact with the second side (4), thus reducing the internal volume of the container, when the axial compression force is applied along the longitudinal axis,
the compression machine comprising:
   at least one lower body having a surface designed to be a resting surface for the base of the collapsible thermoplastic container;
   at least one upper body designed to contact a portion of the collapsible thermoplastic container above the peripheral groove;
   so that the collapsible thermoplastic container can be held in an upright position by the at least one lower body and the at least one upper body,
   actuating means for actuating the at least one lower body and/or the at least one upper body, in order to apply said axial compression force in order to make the first side to come into contact with the second side, thus reducing the internal volume of the collapsible thermoplastic container.

The compression machine allows to compress a plurality of thermoplastic collapsible containers, in particular bottles, in a controlled manner, in order to achieve a controlled deformation thereof. The compression of the bottles can be carried out either simultaneously or sequentially.

The compression machine can also be named pushing machine.

The compression machine can be, for example, of the rotary type or of the linear type.

Rotary compression machines typically allow high production capacity. Preferably, a rotary compression machine is used in an apparatus, or production plant, where other machines are also of the rotary type, e.g. where the blowing machine and/or the filling machine and/or the capping machine are of the rotary type.

Linear compression machines typically permit more versatility. Indeed, a linear compression machine requires relatively simple adjustments to process different formats of bottles.

The invention also provides a hot filling or warm filling process carried out by means of an apparatus according to the invention, comprising a step of applying said axial compression force to one or more collapsible containers simultaneously or sequentially by means of the compression machine.

Preferably, the apparatus which comprises such compression machine is specifically designed so that the intensity of the force required to compress the bottles, in particular to close the peripheral groove, is as low as possible. This advantageously means that the compression machine is very compact and efficient, since it has to apply small forces. Of course, this also results in a compression machine which is cost effective. Indeed, the position of the compression machine in the apparatus layout has been carefully selected in order to optimize the compression of the bottles.

The machine, apparatus and process of the invention are related to the field of hot filling or warm filling of containers, in particular thermoplastic bottles, such as PET bottles.

In particular, the apparatus of the invention is designed to process thermoplastic bottles for hot or warm filling. Such bottles are of the type provided with a peripheral groove which collapses, or closes, on itself when an axial compression force is applied to the bottle. Also, such bottles are not provided with the so called vacuum-panels.

In particular, the apparatus of the invention is designed to process thermoplastic bottles that are not provided with a bottom which changes its concavity when the bottles are compresses by means of the compression machine.

The compression machine can be arranged in different positions of the apparatus, or plant, layout. By way of non-limiting example, the compression machine can be positioned before the capping machine; or between the blowing machine and the filling machine; or immediately after the filling machine; or after the capping machine.

Preferably, but not exclusively, the compression machine is arranged before the cooling means, e.g. a cooling tunnel, where the capped bottles are cooled down. Therefore, the compression machine advantageously applies a force to bottles which are still warm or hot.

According to one embodiment, the compression machine is arranged between the blowing machine and the filling machine. In particular, the compression machine is arranged downstream the blowing machine, preferably directly downstream the blowing machine.

This plant configuration is particularly advantageous because the bottles are warm or hot after the blowing step. Indeed, the molds of the blowing machine are typically heated at a temperature between 105 and 110° C. This facilitates the pushing operation, both in terms of force intensity and time of application. With the pushing operation, bottles are compressed so that their axial height and internal volume are reduced. A further advantage is that polymer chains preserve memory of such compressed configuration. Typically, after the blowing machine, the apparatus comprises a filling machine, a capper, tilting means, and a cooling tunnel. Therefore, the compressed bottles are transferred to the filling machine, where they are filled with hot or warm liquid. It might happen that the heat provided by the hot liquid, causes the bottles to recover their original shape, i.e. before compression. Also, if the bottles are suspended by holding them at the neck ring, it might happen that the weight of the liquid causes or contributes to cause the bottles to recover their original shape. Bottles are then capped by means of the capper, then are tilted and then pass through the cooling tunnel. Typically, in the cooling tunnel the bottles spontaneously recover their compressed configuration, due to the memory of such configuration imparted with the pushing operation and possibly due to the vacuum pressure inside the bottles.

According to another embodiment, the compression machine is arranged after the capping machine, preferably after the tilting means. In particular, the compression machine is arranged downstream the capping machine, preferably downstream the tilting means. More preferably, the compression machine is arranged directly downstream the tilting means.

In any case, the compression machine can optionally be provided with cooling means, such as spray nozzles adapted to spray a cooling medium, such as water and/or air, onto the compressed bottles. It is preferred that such cooling means are configured to locally cool down the collapsible peripheral groove. Indeed, such cooling stabilizes the compressed configuration of the bottles. Also, such cooling starts the cooling of the liquid with consequent generation of vacuum inside the bottles, which contributes to stabilize the compressed configuration when bottles are capped.

Typically, after the compression machine, there is provided a cooling tunnel where the bottles are further cooled down.

The axial force applied to the empty or filled bottles before their capping, can be applied preferably on the neck finish but also on the top of the bottle. The application on the neck finish is preferred to avoid contamination of the mouth of the bottle.

By way of non-limiting example, in the case of the axial force applied to the empty container, e.g. after the blowing machine, the order of magnitude is less than 10 kg while after the container has been capped the order of magnitude is less than 50 kg.

Advantageously, in all the embodiments, the compressed configuration of the bottles is stable and reproducible for a large number of bottles, which is crucial for mass production.

Dependent claims describe preferred embodiments of the invention.

BRIEF DESCRIPTION OF THE FIGURES

Further features and advantages of the invention will become more apparent in light of the detailed description of preferred, but not exclusive embodiments of the invention, illustrated by way of non-limiting example with the aid of the following figures, wherein:

FIG. 21 shows a longitudinal section of part of a bottle and transversal section according to an example.

The same numbers and the same letters of reference in the figures identify the same elements or components.

DESCRIPTION IN DETAIL OF A PREFERRED EMBODIMENT OF THE INVENTION

Figure 1:
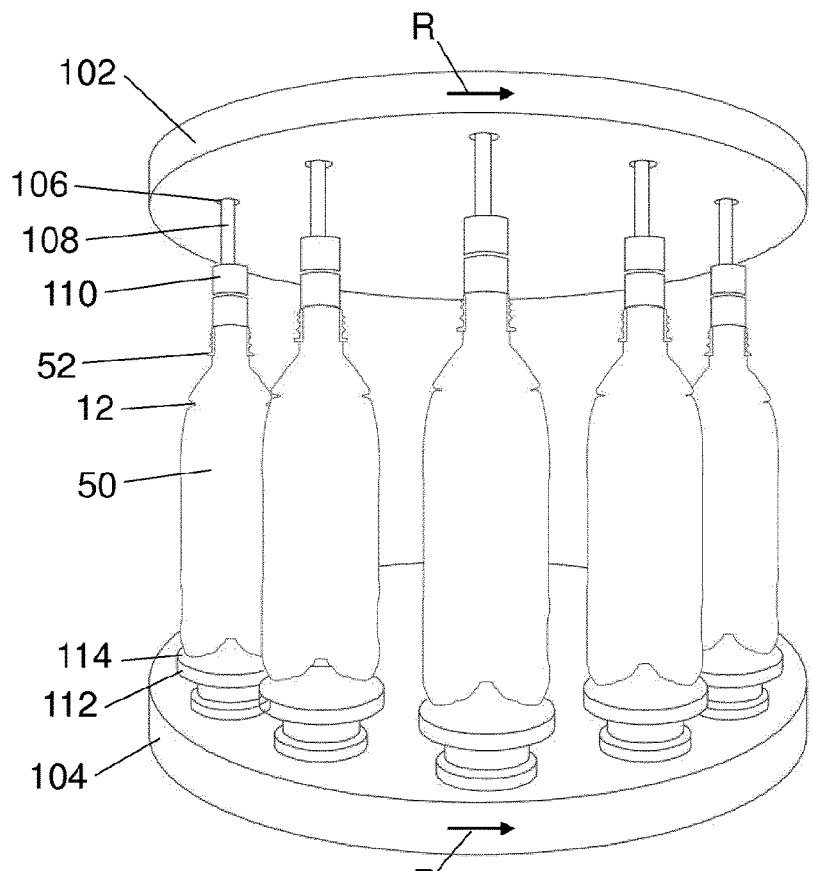
FIG. 1 schematically shows an example of compression machine according to the invention.

The invention provides an apparatus comprising a compression machine for containers, in particular bottles preferably made of PET, provided with a peripheral groove which can collapse or close on itself.

Generally, the compression machine comprises:
  at least one lower body 112, 204, 304 having a surface designed to be a resting surface for the base of the container;
  at least one upper body 108, 116, 118, 119, 202, 212, 308 designed to contact a portion of the container above the peripheral groove 12;
  so that the container can be held in an upright position by the at least one lower body 112, 204, 304 and the at least one upper body 108, 116, 118, 119, 202, 212, 308,
  actuating means for actuating the at least one lower body 112, 204, 304 and/or the at least one upper body 108, 116, 118, 119, 202, 212, 308, in order to apply an axial compression force, acting along a direction parallel to the longitudinal axis Z of the container in order to close the peripheral groove 12. When bottles, for example bottles according to FIGS. from 15 to 21, are processed by the compression machine, the axial compression force is applied in order to make the proximal straight side 3 to come into contact with the distal straight side 4, thus reducing the internal volume of the container.

Thus, the compression machine is configured to apply an axial compression force to the bottles, i.e. a force acting along the longitudinal axis of each bottle. In particular, the compression machine is configured to make the peripheral groove to collapse, or close, on itself. Thus, the compression machine serves to change the configuration, or shape, of the bottles. Each bottle goes from its original configuration to a compressed configuration. The original configuration is the configuration assumed by the bottles immediately after the blowing operation, and the compressed configuration is the configuration with the peripheral groove collapsed on itself. This means that the height, or axial length, and internal volume of the bottles in the compressed configuration is less than their height and volume in the original configuration. In particular, the overall height of the bottles in the compressed configuration is less than their overall height in the original configuration.

The compression machine can be, for example, of the rotary type or of the linear type.

Typically, rotary compression machines are adapted to rotate about a rotation axis substantially parallel to the longitudinal axis Z of the bottle when the bottle is held in upright position by the upper and lower body.

An example of rotary compression machine is shown in FIG. 1. Note for the following Figures only the components useful to understand the invention are shown.

The rotary compression machine comprises two parallel and spaced supports, in particular an upper support 102 and a lower support 104. For example, the supports 102, 104 are disk shaped. The upper support 102 is provided with a plurality of through holes 106 arranged in a circular pattern. A rod 108, or mandrel, is arranged in each through hole 106, and protrudes from the upper support 102 towards the lower support 104. Alternatively, instead of the through holes, linear guides can be provided. Each rod 108 is provided with an end 110, distal from the upper support 102, which can abut against the circular upper end of the mouth of a bottle 50. The lower support 104 is provided with a plurality of base plates 112, arranged in a circular pattern. Each base plate 112 is aligned with a respective rod 108, and the number of base plates 112 is equal to the number of rods 108. The base plates 112 protrude from the lower support 104 towards the upper support 102. Each base plate 112 has a surface 114, distal from the lower support 104, which is a resting surface for the base of a bottle 50. Each bottle 50 can be arranged and held in position between a respective rod 108 and base plate 112. The rotary compression machine is designed and configured to push the bottles, i.e. to apply an axial compression force to the bottles, sequentially. In particular, the rotary compression machine rotates about a vertical axis of rotation in the direction of the arrow R. A cam mechanism is provided (not shown) which actuates a vertical movement of the rods 108 and/or of the base plates 112, as explained below.

Some bottles (left hand side) are shown in their original configuration, i.e. before the application of the compression, or pushing force, and some bottles (right hand side) are shown in the compressed configuration, i.e. after the application of the pushing force which closes the peripheral groove.

As mentioned, in order to sequentially push the bottles 50, rods 108 and/or base plates 112 can move. For example, base plates 112 can move vertically upwards, towards the upper support 102, while the rods 108 are fixed in position, thus counteracting the pushing force applied by the base plates 112. Alternatively, rods 108 can move vertically downwards, towards the lower support 104, while the base plates 112 are fixed in position. Alternatively, the rods 108 and base plates 112 can move towards each other. Typically, rods 108 and/or base plates 112 are designed to be moved by a predetermined length. For example, when there is provided a movement of only rods 108 or of only base plates 112, the rods 108 or base plates 112 are designed to travel for a length comprised between 4 and 8 mm. When there is provided a movement of both rods 108 and base plates 112, the rods 108 and base plates 112 are each designed to travel for a length comprised between 5 and 7 mm.

The compression machine also comprises suitable actuating means for actuating the movement of the rods and/or base plates. In particular, actuating means for actuating the cam mechanism which, in turn, actuates the movement of the rods and or base plates can be provided.

The compression machine of FIG. 1 is shown when pushing empty bottles.

Figure 2:
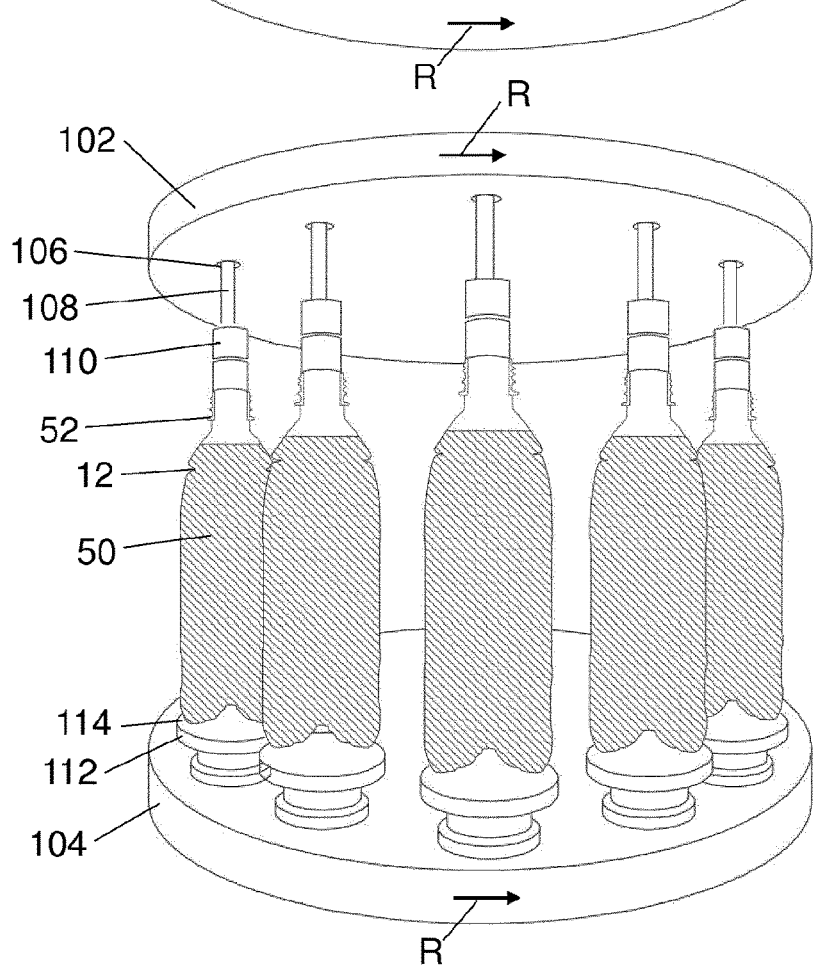
FIG. 2 schematically shows another example of compression machine according to the invention.

Alternatively, the same compression machine can push filled bottles, as shown in FIG. 2.

Figure 3:
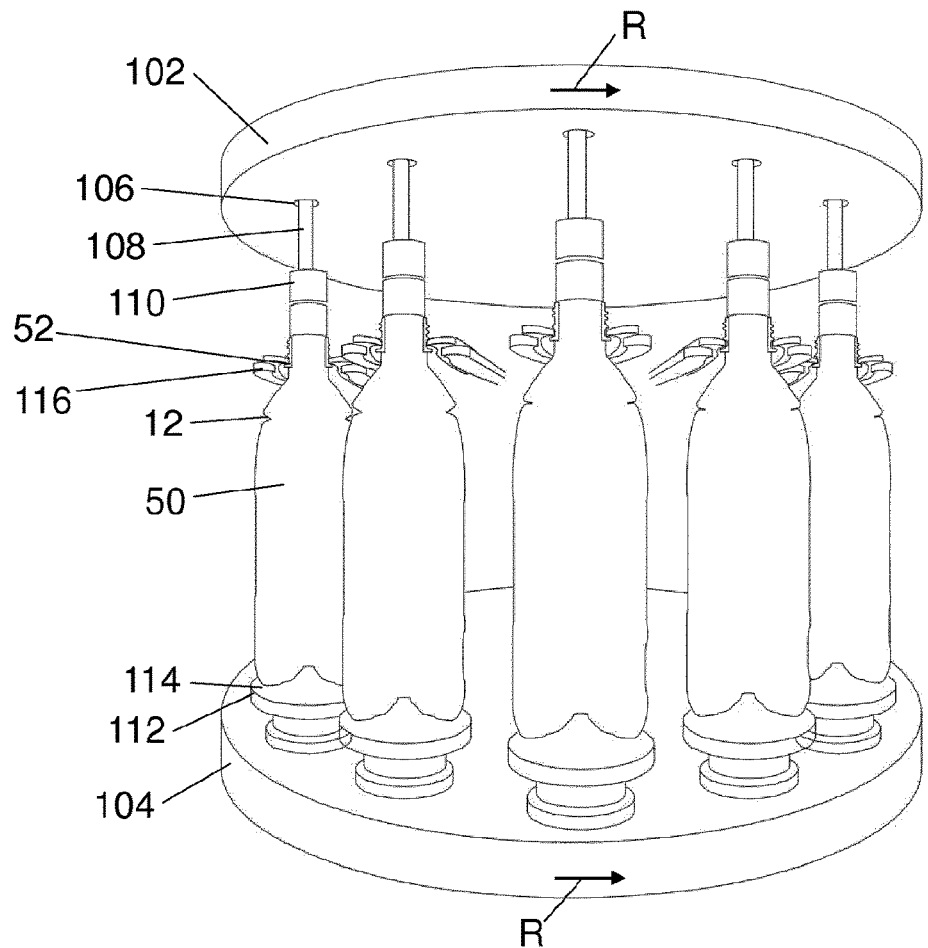
FIG. 3 schematically shows another example of compression machine according to the invention.

FIG. 3 shows an alternative variant of the rotary compression machine of FIG. 1. The compression machine of FIG. 3 in addition comprises a clamp 116, or gripper, for each bottle 50. In particular, each clamp 116 is designed to clamp the portion of a bottle located immediately above the neck ring 52. Note that the skilled person can easily understand the meaning of neck ring. Clamps 116 can optionally be moved downwards, acting on the neck ring 52, in order to apply the axial compression force.

Figure 4:
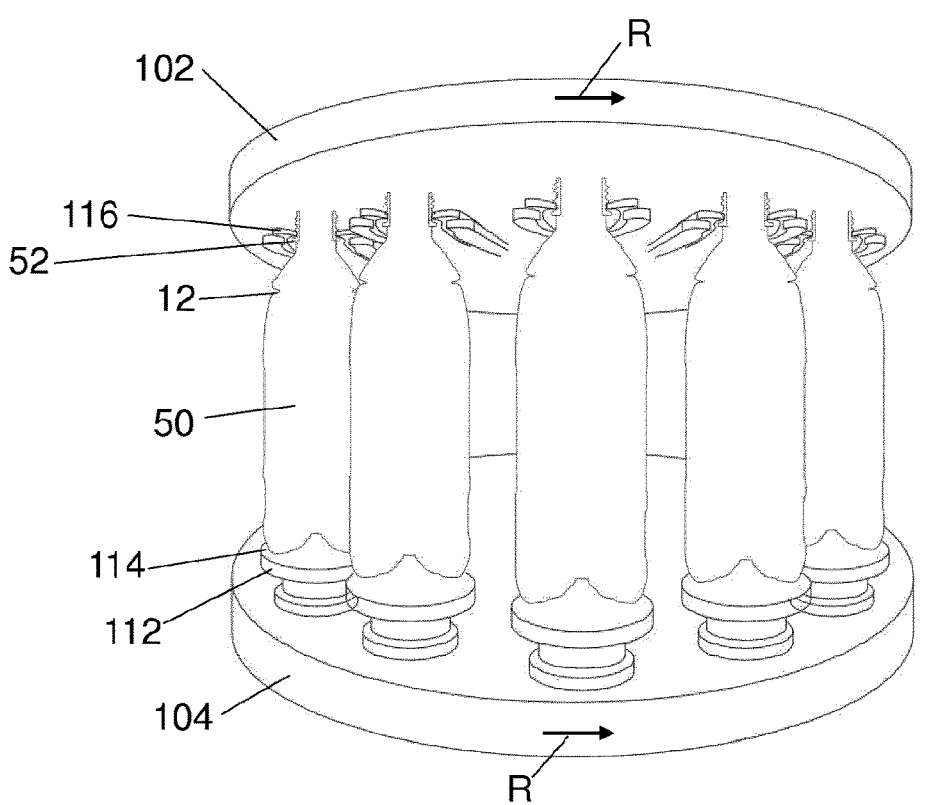
FIG. 4 schematically shows another example of compression machine according to the invention.

In a variant shown in FIG. 4, the compression machine of FIG. 3 is not provided with rods 108. When rods 108 are not provided, any possible contamination of the mouth of the bottles 50 is avoided. The compression of each bottle 50 can be achieved by a vertical movement of the respective base plate 112 and/or clamp 116. When the clamps 116 are designed to move, in particular downwards, acting on the neck ring 52, there are provided suitable actuating means for actuating the movement of the clamps 116.

Figure 5:
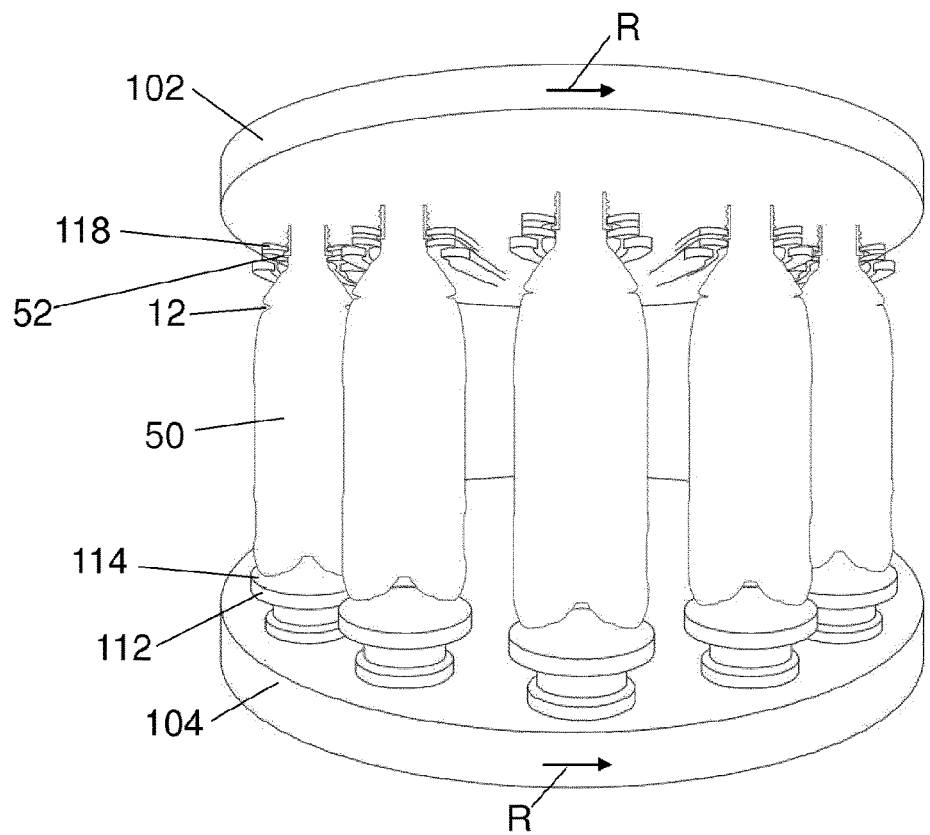
FIG. 5 schematically shows another example of compression machine according to the invention.

FIG. 5 shows an alternative variant of the rotary compression machine of FIG. 4. Also the compression machine of FIG. 5 comprises a clamp 118 for each bottle 50. Each clamp 118 is designed to clamp the neck ring 52 of each bottle 50. In particular, each clamp 50 is designed to clamp the portion of a bottle located immediately above the neck ring 52 and the portion of the bottle immediately below the neck ring 52. The compression of each bottle can be achieved by a vertical movement of the respective base plate 112 and/or of the clamp 118. When the clamps 118 are designed to move, in particular downwards, there are provided suitable actuating means for actuating the movement of the clamps 118.

Figure 6:
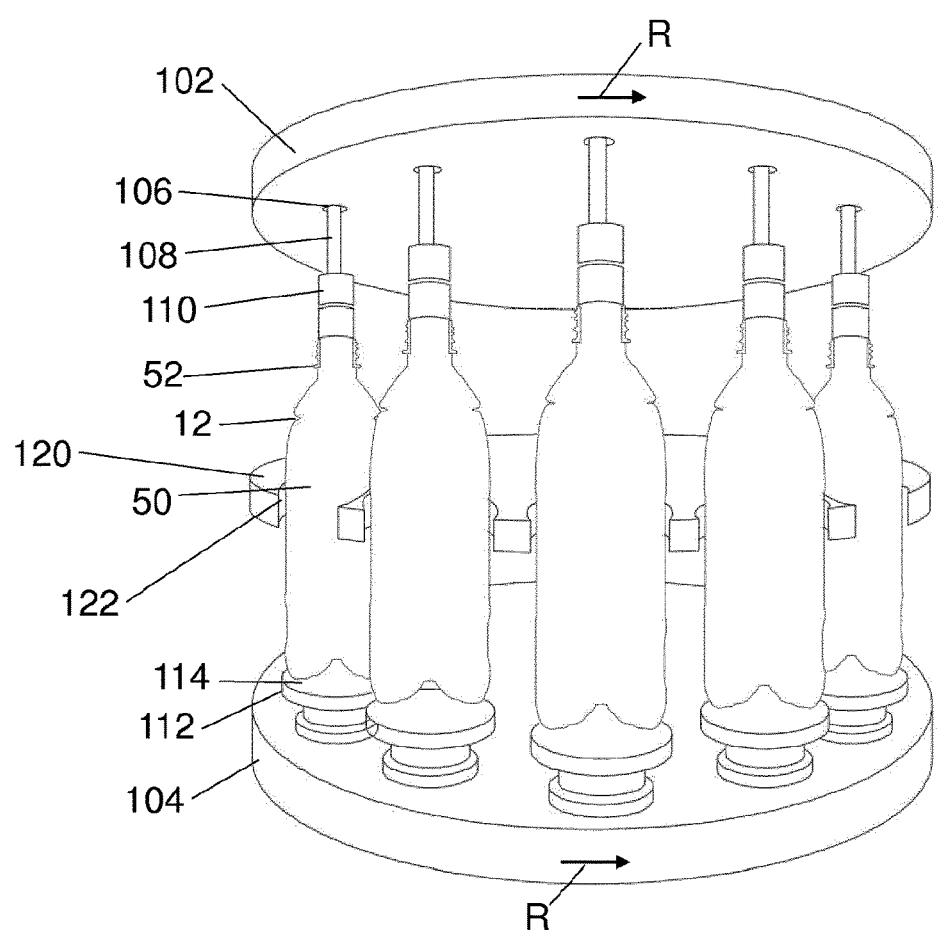
FIG. 6 schematically shows another example of compression machine according to the invention.

FIG. 6 shows an alternative variant of the rotary compression machine of FIG. 1. The compression machine of FIG. 6 additionally comprises a wheel 120 arranged between the upper support 102 and lower support 104. The wheel 120 is provided with a plurality of grooves 122 or seats. Each groove 122 can accommodate a bottle 50, and contributes to hold the bottles 50 in the upright position, in particular during the application of the pushing force. Typically, also the wheel 120 rotates together with the upper support 102 and lower support 104.

Figure 7:
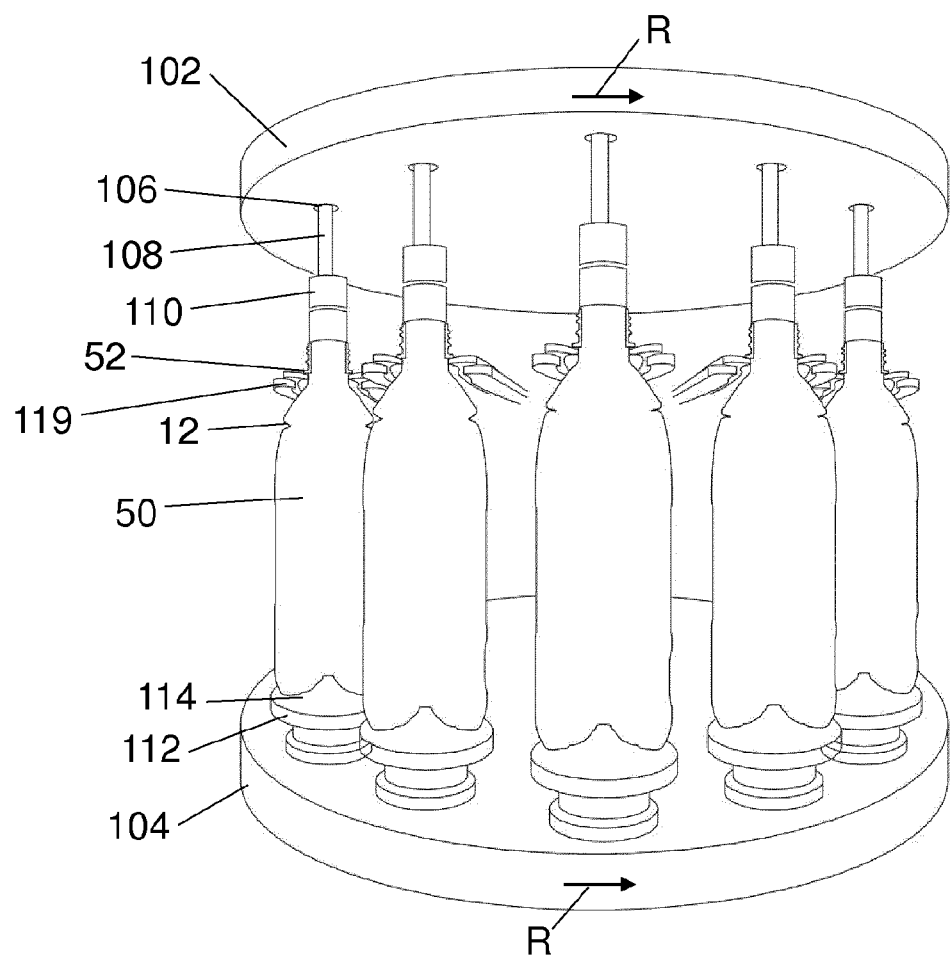
FIG. 7 schematically shows another example of compression machine according to the invention.

FIG. 7 shows an alternative variant of the rotary compression machine of FIG. 3. Also the compression machine of FIG. 7 comprises a clamp 119 for each bottle 50. Each clamp 119 is designed to contact the shoulder of each bottle 50, below the neck ring 52. The compression of each bottle 50 can be achieved by a vertical movement of the respective base plate 112 and/or rod 108. Clamps 119, which act on the shoulder of each bottle, are designed to guide the bottle. In particular, clamps 119 contribute to hold the upright position of the bottle. When the clamps 119 are designed to move, in particular downwards, there are provided suitable actuating means for actuating the movement of the clamps 119.

Note that in the variants not comprising the rods, the upper support is not necessary. In this case the clamps, or grippers, can be restrained to the lower support. For example, a central support structure provided with the clamps can be restrained to the lower support.

Figure 8:
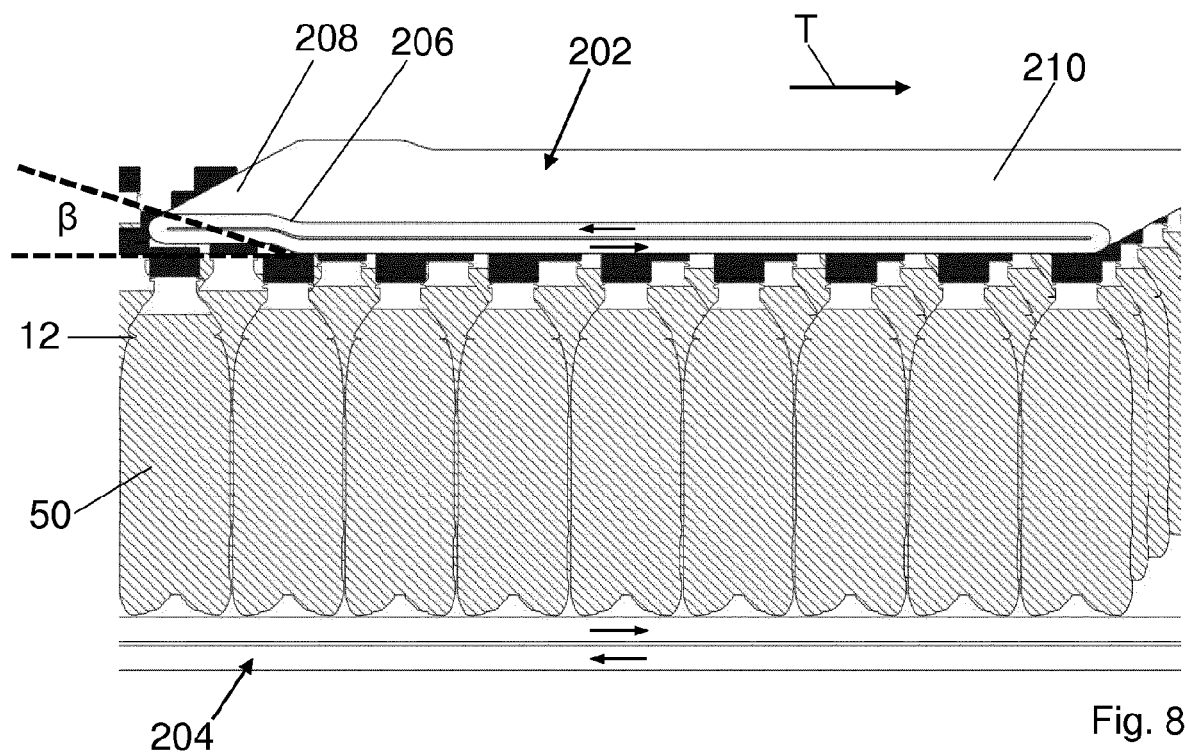
FIG. 8 schematically shows another example of compression machine according to the invention.

FIG. 8 shows an example of linear compression machine. The linear compression machine comprises a lower conveyor belt 204 where a plurality of bottles 50 can rest. In particular, the base of each bottle rests on the upper surface of the lower conveyor belt 204. The linear compression machine also comprises an upper conveyor belt 202. The upper conveyor belt 202 and the lower conveyor belt 204 are motorized. Preferably, the upper conveyor belt 202 and the lower conveyor belt 204 are synchronized, i.e. move at the same speed. The upper conveyor belt 202 and the lower conveyor belt 204 define, in use, a same advancing direction T for the bottles. Note that in the embodiments comprising a linear compression machine, the upper conveyor belt and/or the lower conveyor belt can also be conveyors of different type, e.g. chain conveyors or similar.

The upper conveyor belt 202 is provided with an inclined portion 206, or step. In particular, the upper conveyor belt 202 is provided with two substantially straight portions 208, 210 connected by the inclined portion 206. Optionally, the first portion 208 is not provided, i.e. there is provided only the inclined portion 206 and the second straight portion 210.

The lower surface of the first portion 208 and of the upper portion 210 is substantially parallel to the upper surface of the lower conveyor belt 204. The distance between the lower surface of the first portion 208 (left-hand side, FIG. 8) from the upper surface of the lower conveyor belt 204 is greater than the distance between the lower surface of the second portion 210 (right-hand side, FIG. 8) from the upper surface of the lower conveyor belt 204. Also, at the inclined portion 206, the distance between the lower surface of the upper conveyor belt 202 and the upper surface of the lower conveyor belt 204 gradually decreases. For example, the step 206 forms an acute angle β with the lower surface of the first portion 208—or equivalently of the second portion 210—which is preferably lower than 60°, e.g. comprised in a range between 1° and 45°, extremes included. The step 206 prevents the tilting of the bottles. By way of example, when a container having a height of 189 mm (original configuration) has to be compressed, the distance between the lower surface of the first portion 208 (when provided) from the upper surface of the lower conveyor belt 204 is greater than 189 mm; and the distance between the lower surface of the second portion 210 from the upper surface of the lower conveyor belt 204 is comprised between 177-179 mm.

In general, it is preferred that the height difference between the original configuration and the compressed configuration is of 10-12 mm, preferably maximum 15 mm, in particular for bottles having a final volume of 500 ml.

The linear compression machine is designed to transport the bottles 50 in a direction which goes from the first portion towards the second portion, as shown by arrow T. Thus, bottles in their original configuration are placed on the lower conveyor belt 204, below or at the left of the first portion, so that the circular upper end of the mouth of each bottle or the cap (if the bottles are capped) is near, without contact, the lower surface of the first portion 208.

Figure 9:
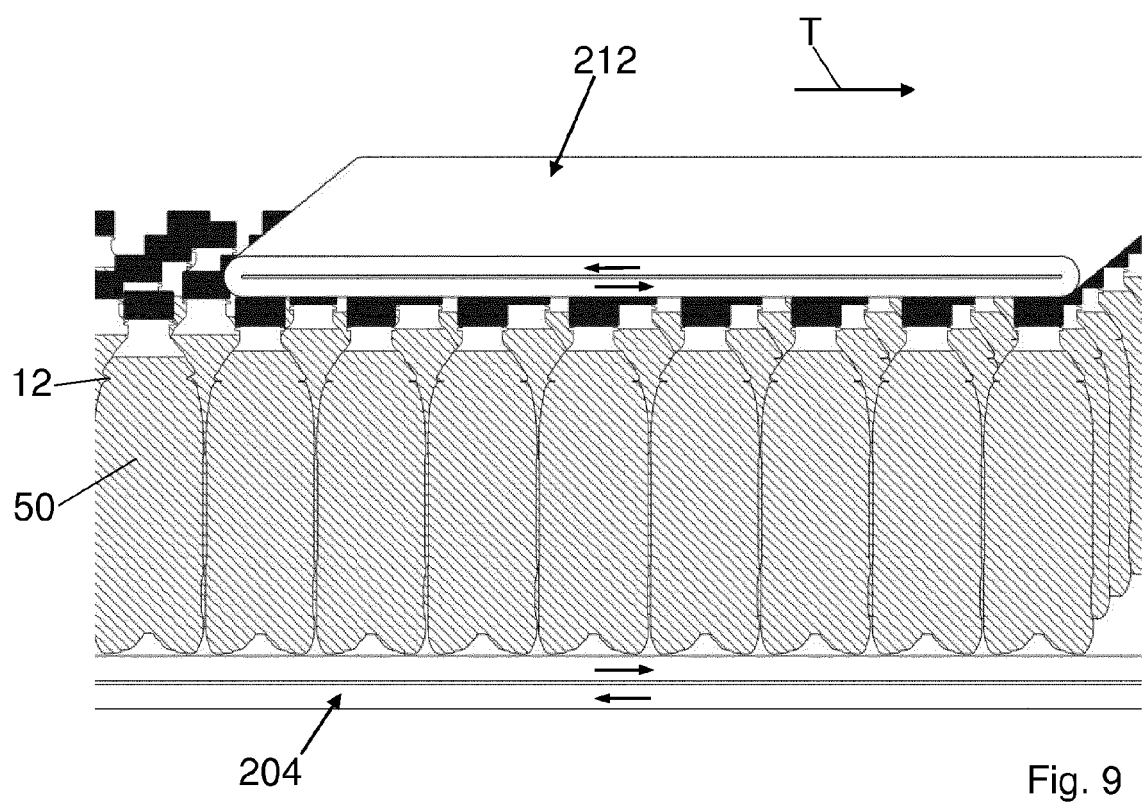
FIG. 9 schematically shows another example of compression machine according to the invention.

As the bottles 50 reach the step 206, the compression of the bottles starts. The length of the second portion 210 and the advancement speed of the conveyor belts 202, 204 can be designed to achieve an optimal compression of the bottle, which ensures a stable conformation when the bottles leave the linear compression machine. Indeed, it may be required that the compressed bottles remain at the second portion 210 for a certain time to ensure a stable conformation of the bottles 50. For example, the linear compression machine can be designed so that each bottle remains at the second portion 210 for a time comprised between 1 and 5 minutes. For example 2 minutes is sufficient when the final temperature of the container is below 45° C. By way of example, when the advancing speed is of about 10 bottles/second, the length of the second portion is of about 10-20 meters. FIG. 9 shows a variant of linear compression machine. In this variant, the upper conveyor belt 212 is substantially straight, i.e. is not provided with a step. The compression of the bottles is achieved, simultaneously, by a vertical movement of the upper conveyor belt 212.

Figure 10:
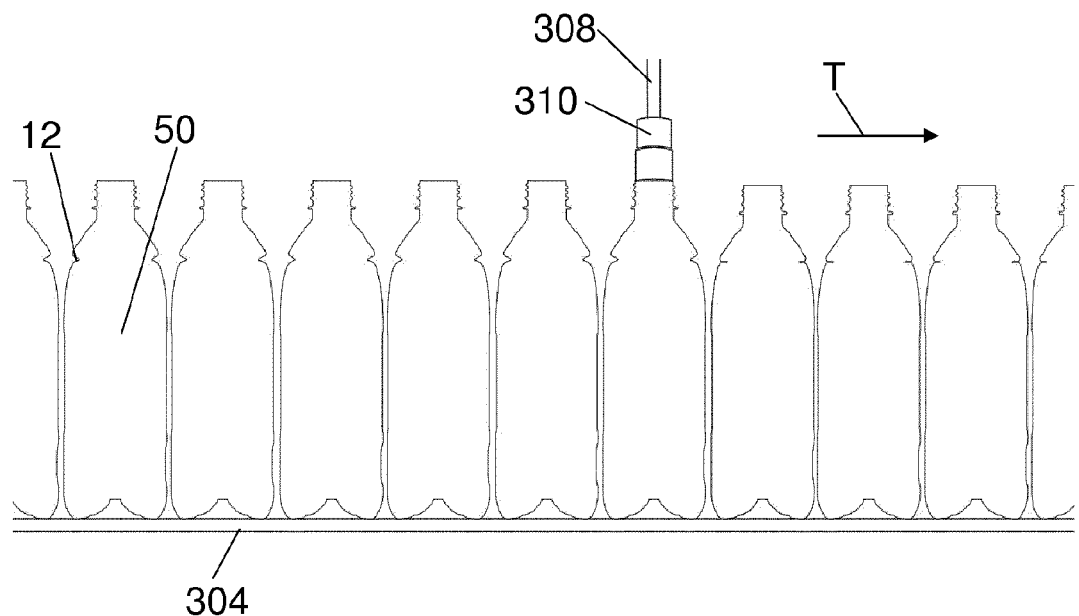
FIG. 10 schematically shows another example of compression machine according to the invention.
Figure 11:
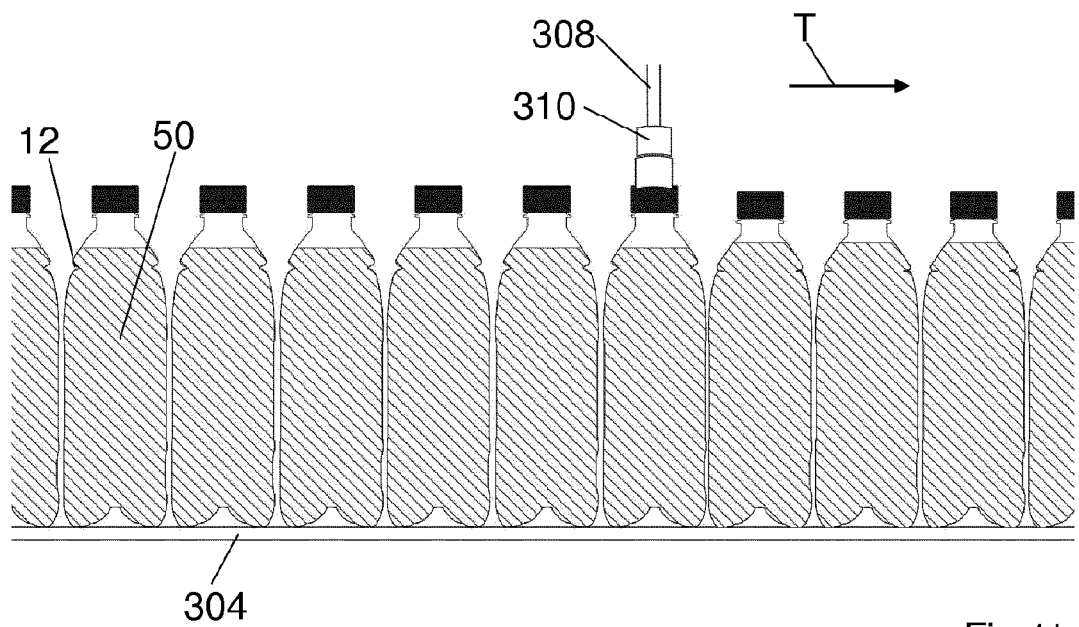
FIG. 11 schematically shows another example of compression machine according to the invention.
Figure 12:
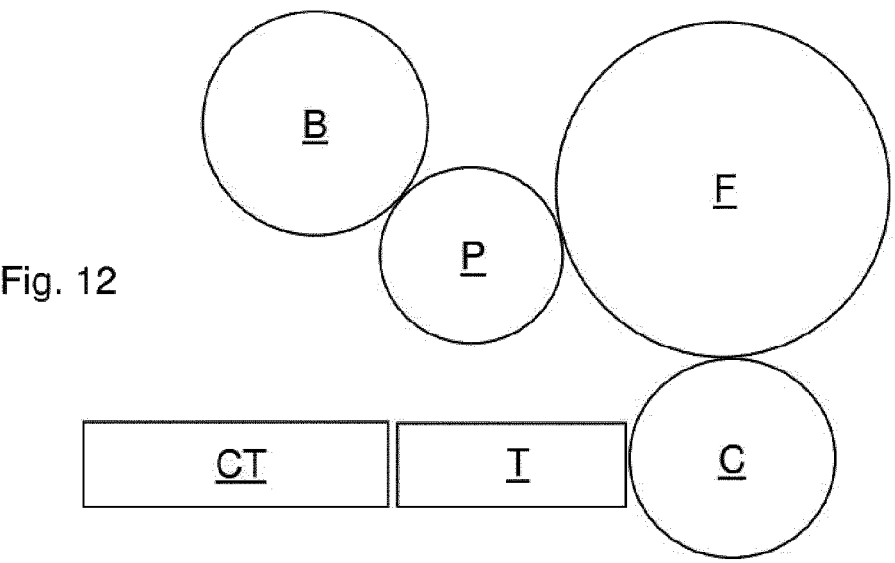
FIG. 12 schematically shows an example of apparatus layout according to the invention.

FIGS. 10 and 11 show another example of linear compression machine, which comprises a lower support 304 and a rod 308. The base of the bottles can rest on the upper surface of the lower support 304. The rod 308 extends and is configured to move vertically, i.e. along a direction substantially perpendicular the upper surface of the lower support 304. Note that more than one rod can be provided, and in this case the rods are arranged parallel to each other, and can move simultaneously. The rod 308 is provided with an end 310, which can abut against the circular upper end of the mouth of a bottle 50. The vertical movement of the rod 308 causes the compression of the bottle arranged aligned and below the rod 308. The lower support is preferably a conveyor belt. Alternatively, the rod 308 can move also horizontally in order to be sequentially aligned with each bottle to be compressed.

The bottles shown in FIG. 10 are empty bottles, and the bottles shown in FIG. 11 are filled and capped.

Note that in all the embodiments, despite what is specifically shown in the Figures, the bottles processed by the compression machine may also be empty and uncapped bottles or filled and uncapped bottles, according to the position of the compression machine in the layout of the apparatus.

In all the embodiments, the compression machine can optionally be provided with cooling means, such as spray nozzles adapted to spray a cooling medium, such as water and/or air, onto the compressed bottles. It is preferred that such cooling means are configured to locally cool down the collapsible peripheral groove. Indeed, such cooling stabilizes the compressed configuration of the bottles. Also, such cooling starts the cooling of the liquid with consequent generation of vacuum inside the bottles, which contributes to stabilize the compressed configuration.

The invention also provides an apparatus, or production plant, of the hot or warm filling type. The apparatus is thus configured to carry out an hot or warm filling process. FIGS. 12,13, 14 and 14a schematically show examples of apparatuses according to the invention.

The apparatus typically comprises at least: a blowing machine B, a filling machine F, a capping machine C, tilting means T, and a cooling tunnel CT.

The blowing machine B, filling machine F, and capping machine C can be of the rotary or linear type. For example, such machines can be constructed in the form of a carousel or wheel, which rotate about a respective vertical axis of rotation. One or more transfer means TW, such as a transfer wheel, can be provided between such machines. In addition, loading wheels and unloading wheels, well known to those skilled in the art, can be provided.

The blowing machine B is preferably an Injection Stretch Blow Moulding machine.

The blowing machine B comprises a plurality of moulds and produces bottles by blowing preforms. The moulds are heated, for example at a temperature comprised between 105 and 110° C. Typically, the heating of the molds is performed at body area. Therefore, after the blowing process, the blown bottles are still warm. Typically, but not exclusively, after the blowing process, the bottles are at a temperature comprised between 30 and 60° C.

The filling machine F injects hot or warm liquid in each bottle. For example, in a warm filling process, bottles are filled with a liquid which is typically at a temperature between 60 and 75° C., while in a hot filling process bottles are filled with a liquid which is typically at a temperature between 85 and 92° C.

The capping machine C applies caps to the bottles.

After capping the bottles are rotated, or tilted, by means of tilting means T, or tilting machine or station. Typically, the tilting means T comprise a linear conveyor. By way of example, the tilting operation comprises a step wherein bottles are rotated by an angle of about 90°, and this position is kept for about 30 seconds. Then, bottles are rotated again, so that they are upright, i.e. in a vertical position with the cap upwards. Tilting means Tare well known in the art, and therefore will not be further described. Such tilting means, not shown, are typically arranged after the capping machine C.

The cooling tunnel CT typically comprises transport means, e.g. a conveyor belt, to transport the bottles. The cooling tunnel also comprises series of nozzles adapted to spray a cooling medium, e.g. water, onto the bottles. Preferably, as bottles move forward along the tunnel, water is sprayed at a decreasing temperature.

In addition, the apparatus comprises a compression machine P, also named pushing machine. The compression machine is configured to apply an axial compression force to the bottles, i.e. a force acting along the longitudinal axis of each bottle. In particular, the compression machine is configured to make the peripheral groove to collapse, or close, on itself. Thus, the compression machine serves to change the configuration, or shape, of the bottles. Each bottle goes from its original configuration to a compressed configuration. The original configuration is the configuration assumed by the bottles after the blowing operation, and the compressed configuration is the configuration with the peripheral groove collapsed on itself. This means that the height, or axial length, and volume of the bottles in the compressed configuration is less than their height and volume in the original configuration. The compression machine P can be of the rotary or linear type. For example, but not exclusively, the compression machine can be one of the compression machines shown in FIGS. from 1 to 11.

According to a first embodiment (FIG. 12), the compression machine P is arranged between the blowing machine B and the filling machine F. In particular, the compression machine P is arranged downstream the blowing machine B, preferably directly downstream the blowing machine B. A loading wheel and an unloading wheel, not shown, can be provided in order to arrange the bottles in the compression machine P.

In this embodiment, the compression machine P is preferably configured to apply a force comprised between 10 and 60 N, preferably between 20 and 50 N. The time during which such force is applied is preferably comprised between 0.1 and 6 seconds.

The apparatus may optionally also comprise one or more transfer wheels TW to transfer the bottles from one machine to another, for example from the blowing machine B to the filling machine F. Transfer means can be of the rotary or linear type.

Figure 13:
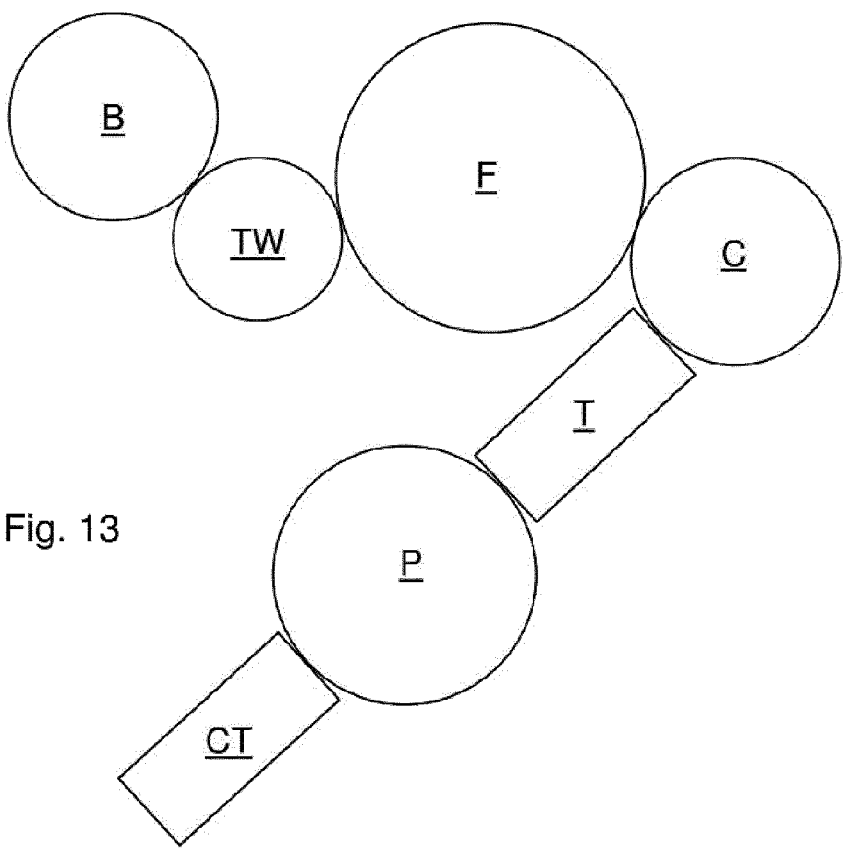
FIG. 13 schematically shows another example of apparatus layout according to the invention.

According to another embodiment, shown in FIG. 13, the compression machine P is arranged after the capping machine C, preferably after the tilting means T. In particular, the compression machine P is arranged downstream the capping machine C, preferably downstream the tilting means T. More preferably, the compression machine P is arranged directly downstream the tilting means T.

In this embodiment, the compression machine P is preferably configured to apply a force comprised between 100 and 600 N, preferably between 300 and 500 N. The time during which such force is applied is preferably comprised between 60 and 300 seconds.

According to another embodiment, not shown, the compression machine is arranged after the cooling tunnel. In particular, the compression machine is arranged downstream the cooling tunnel, preferably directly downstream the cooling tunnel.

In this embodiment, the compression machine is preferably configured to apply a force comprised between 100 and 300 N, preferably between 120 and 280 N. The time during which such force is applied is preferably comprised between 10 and 120 seconds.

Figure 14:
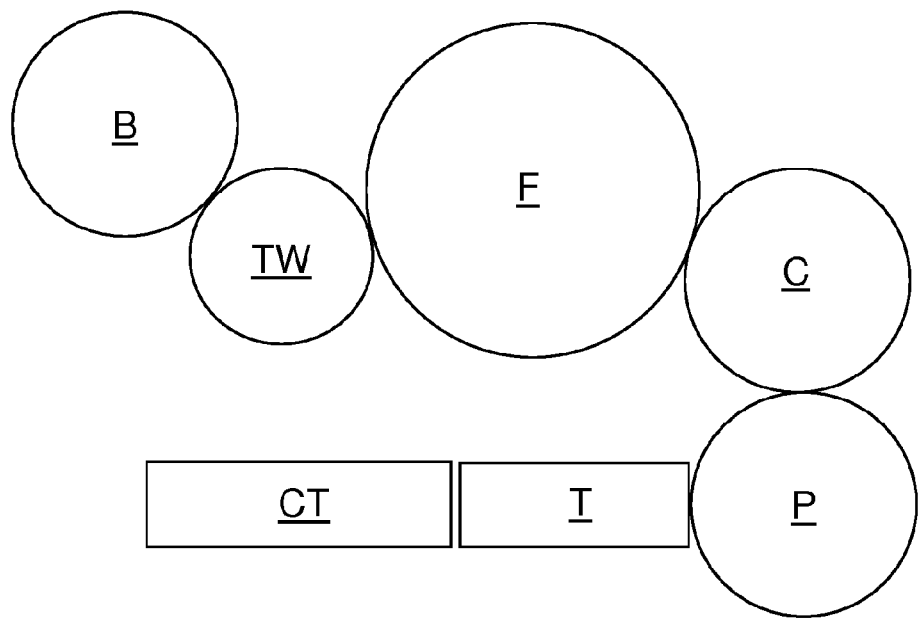
FIG. 14 schematically shows another example of apparatus layout according to the invention.

According to a further embodiment shown in FIG. 14, the compression machine P is arranged after the capping machine C and before the tilting means T.

Figure 14A:
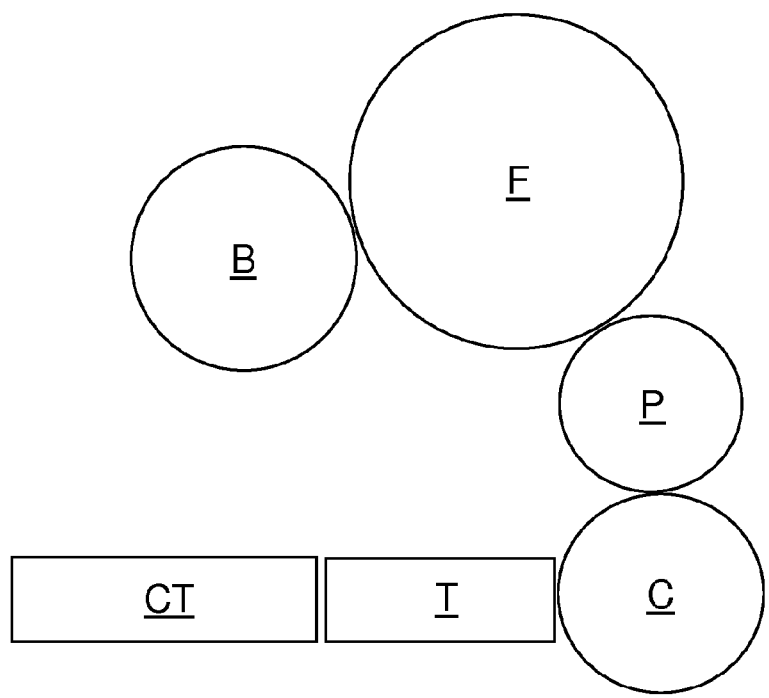
FIG. 14a schematically shows another example of apparatus layout according to the invention.

According to a further embodiment shown in FIG. 14a, the compression machine P is arranged after the filling machine F and before the capping machine C.

According to a further embodiment, the capping machine is also used as a compression machine.

According to a further embodiment, the filling machine is also used as a compression machine. Indeed, in this case, the filling machine is configured to apply an axial compression force to the bottles. Thus, the same machine can both fill and compress the bottles. Compression of the bottles can be performed before, during or after the filling operation.

According to other embodiments, the apparatus configuration, or layout, is such that the compression machine is arranged, by way of non-limiting example, before the capping machine or after the capping machine. Also, the compression machine can be implemented on any intermediate star wheel between the blowing machine and the filing machine, or between the filling machine and the capping machine.

According to still further embodiments, the blowing machine is distinct from the system, or apparatus, comprising the compression machine. Preferably, in this case, with reference to FIGS. 12-14, the blowing machine B is replaced by a rinser, or rinsing machine, and the bottles are preferably supplied to the filling machine using air conveyors, the bottles being supplied by a blowing machine or by an unscrambler.

Alternatively, there is provided a line where the compression machine is positioned before the rinser, and is integrated in a compressing/rinsing/filling/capping apparatus or before the rinsing/filling/capping apparatus as a stand alone apparatus, both configurations supplied with bottles by air conveyors arranged between the filling machine and the Blower or the unscrambler.

Alternatively, the invention provides an apparatus for hot filling or warm filling comprising a blowing machine B, a silos and/or an unscrambler adapted to be supplied with bottles by the blowing machine B, wherein there is provided a compression machine P configured to apply an axial compression force to a collapsible thermoplastic container along a longitudinal axis Z thereof, wherein said compression machine P is positioned after the blowing machine, e.g. between the blowing machine and the silos and/or unscrambler, the compression machine being preferably directly connected to the blowing machine, wherein the collapsible thermoplastic container is designed for a hot filling or warm filling process and comprises:
  a body provided with a shoulder,
  a neck 13, provided with a circular upper end defining an opening at a first side of the body, and with a neck ring 52,
  a base, defining a base plane at a second side of the body opposite to the first side, the body having a peripheral groove 12, between the neck 13 and the middle of the container along the longitudinal axis Z, comprising a first side 3, proximal to the neck 13, and a second side 4, distal from the neck 13, whereby the first side 3 comes into contact with the second side 4, thus reducing the internal volume of the container, when the axial compression force is applied along the longitudinal axis Z, the compression machine P comprising:
  at least one lower body 112, 204, 304 having a surface designed to be a resting surface for the base of the collapsible thermoplastic container;
  at least one upper body 108, 116, 118, 119, 202, 212, 308 designed to contact a portion of the collapsible thermoplastic container above the peripheral groove 12; so that the collapsible thermoplastic container can be held in an upright position by the at least one lower body 112, 204, 304 and the at least one upper body 108, 116, 118, 119, 202, 212, 308,
  actuating means for actuating the at least one lower body 112, 204, 304 and/or the at least one upper body 108, 116, 118, 119, 202, 212, 308, in order to apply said axial compression force in order to make the first side 3 to come into contact with the second side 4, thus reducing the internal volume of the collapsible thermoplastic container.

Preferably, but not exclusively, in all the embodiments of the invention, the bottles are filled so that the head space volume is 4 to 8% of the total volume of the bottle in its original configuration.

The invention also provides a hot filling or warm filling process wherein there is provided an apparatus according to the invention, comprising a step of applying said axial compression force to one or more collapsible containers simultaneously or sequentially by means of the compression machine.

For example, the invention provides a hot filling or warm filling process comprising, in sequence, the following steps:
  producing a plurality of collapsible thermoplastic containers by means of the blowing machine B;
  applying said axial compression force to the collapsible thermoplastic containers simultaneously or sequentially by means of the compression machine P;
  filling the collapsible thermoplastic containers by means of the filling machine F.

According to another example, the invention provides a hot filling or warm filling process comprising, in sequence, the following steps:
  producing a plurality of collapsible thermoplastic containers by means of the blowing machine B;
  filling the collapsible thermoplastic containers by means of the filling machine F;

applying said axial compression force to the collapsible thermoplastic containers simultaneously or sequentially by means of the compression machine P;

capping the collapsible thermoplastic containers by means of the capping machine C.

By way of non-limiting example, there are described below examples of a container which is suitable to be processed by the compression machine and apparatus of the invention.

It is a collapsible thermoplastic container for liquids, suitable for hot filling, warm filling or cold filling processes of non-carbonated liquids, defining a longitudinal axis Z, and comprising:

a body, a neck, provided with an opening at a first side of the body, a base, defining a base plane at a second side of the body opposite to the first side, the body having two substantially frustoconical or frustopyramidal portions having their smaller bases opposed to each other, so as to constitute a peripheral groove, between the neck and the middle of the container along the longitudinal axis Z, having a V-shaped profile on its projection on a first plane coplanar with the longitudinal axis Z, the V-shaped profile having an apex pointing towards the longitudinal axis Z; a proximal straight side, proximal to the neck, having a first slope of first angle with respect to a second plane perpendicular to the longitudinal axis Z, and a first length; and a distal straight side, distal to the neck, having a second slope of second angle with respect to said second plane, and a second length, wherein the second length is smaller than the first length, and wherein the first angle is greater than the second angle, whereby the proximal straight side comes into contact with the distal straight side, thus reducing the internal volume of the container, when a compression force greater than a force resulting from atmospheric pressure is applied along the longitudinal axis Z, optionally only when such a compression force is applied. The container, in particular a bottle, is made of a thermoplastic material, such as PET. The bottle is designed to avoid uncontrolled shrinkage effects due to pressure variations.

In order to compensate the internal pressure variation in the bottle, the bottle is designed so that by applying an axial external force, i.e. a force acting along the longitudinal axis Z of the bottle, the internal volume and the height of the bottle are reduced in a controlled manner. This reduction in volume, due to the decrease in height of the bottle, creates an increase in the internal pressure which can compensate any pressure reduction that may occur because of the temperature or volume variation of the contained liquid in the various phases of the life cycle of the packaged product. If there is no pressure reduction, as previously described, then the bottle can withstand higher vertical top loads due to this reduction in volume. This kind of bottles can have different cross sections transversal to the longitudinal axis Z of the bottle, such as cylindrical, square, octagonal, polygonal cross sections, etc. By way of non-limiting example, the bottles can have a volume ranging from 500 ml to 1000 ml. For instance, a container of the invention can have a volume of 500 ml and a weight of 18-22 g, preferably 18-20 g, e.g. 19 g.

In the present document, part of the following description will be carried out referring to the projection on a plane, in particular on a plane coplanar with the longitudinal axis Z.

Figure 15:
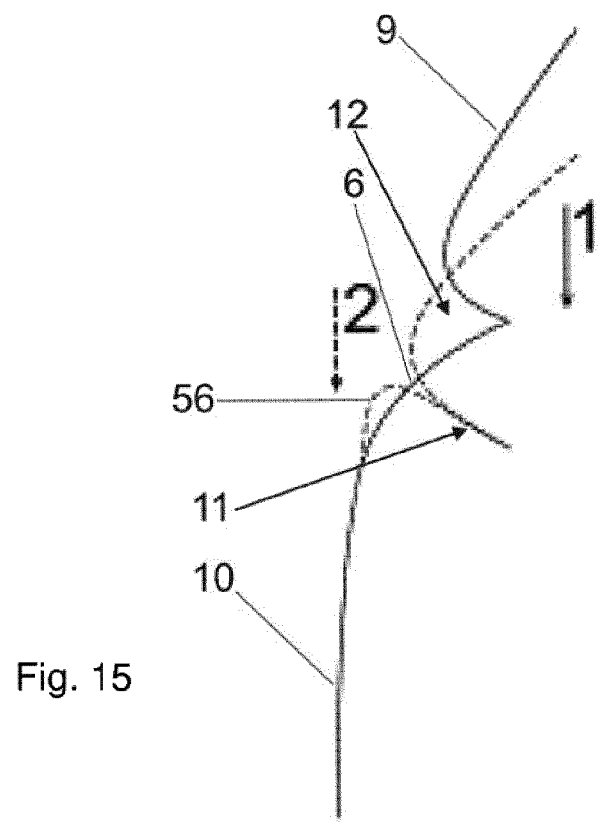
FIG. 15 shows the cross section profile of a detail of a bottle provided with a peripheral groove, showing the collapsing sequence by applying an external compressive force.
Figure 16:
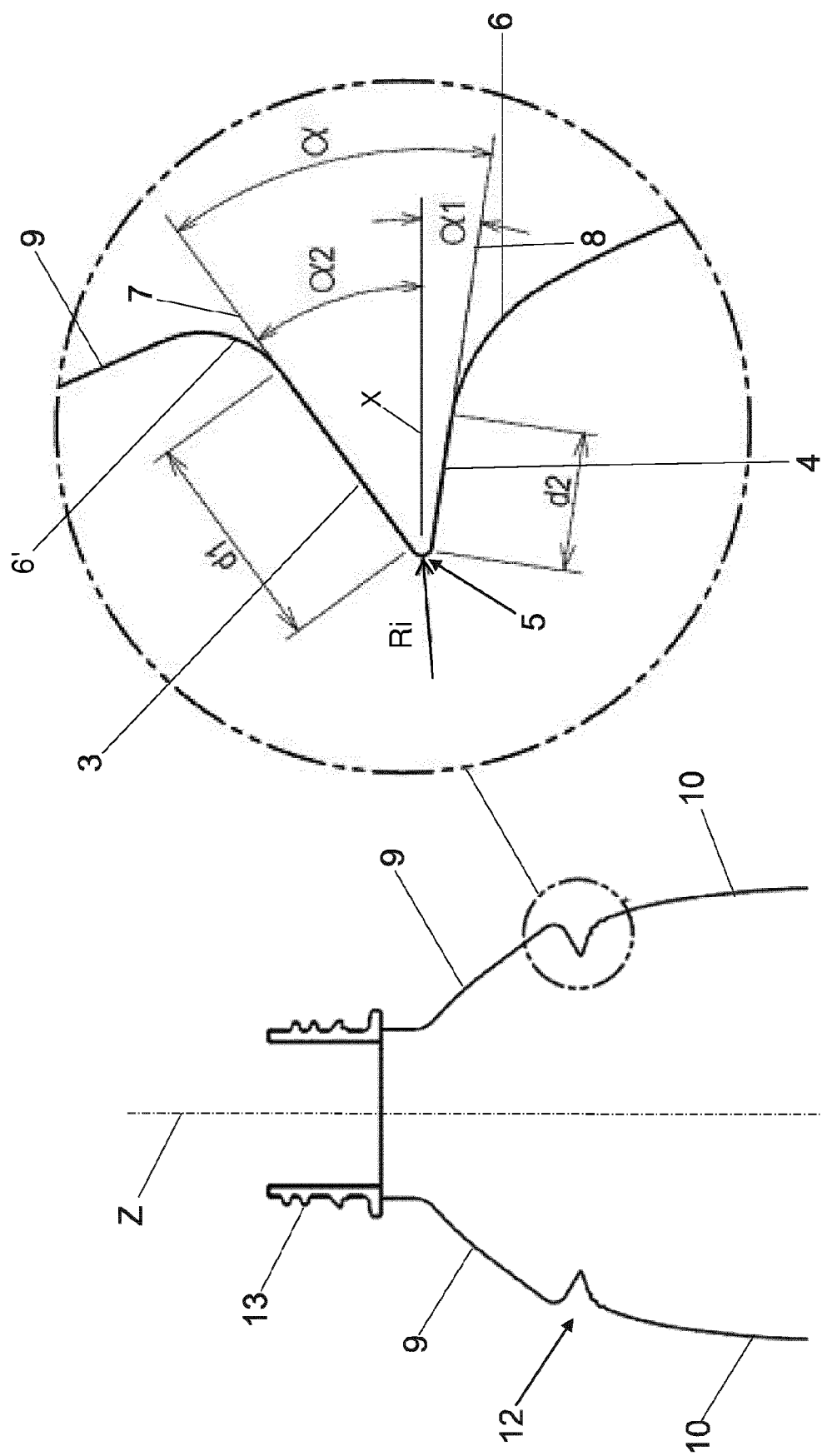
FIG. 16 shows a longitudinal section profile and an enlarged detail of part of a bottle according to FIG. 15.

Referring to FIG. 15 and FIG. 16, according to a first example, the bottle defines a longitudinal axis Z, and comprises a body having a neck 13 with an opening at one side, and a base, which closes the bottle and defines a base plane, opposite to the neck 13. The body has a part 9 proximal to the neck 13 and a part 10 distal from the neck 13. Between the proximal 9 and distal 10 parts, there are two substantially frustoconical portions of the body, having their smaller base opposed to each other. In other words, the larger base of the frustoconical portion, which is proximal to the neck 13, points towards the proximal part 9, and the larger base of the frustoconical portion, which is distal from the neck 13, points towards the distal part 10. In this manner, a peripheral groove 12 is formed, which in this example is a circumferential groove, having a V-shaped profile on its projection on a plane coplanar with the longitudinal axis Z and its apex 5 pointing towards the longitudinal axis Z. Preferably, the peripheral groove is located at the "shoulder" of the container, i.e. in the curved portion of the bottle which is proximal to its neck. The V-shaped profile has two straight sides, i.e. a first straight side 3 proximal to the neck 13, and a second straight side 4 distal from the neck 13. Therefore, the peripheral groove 12 is a gap having a length along the longitudinal axis Z which decreases from the external side of the bottle to the apex 5. In this example, the apex is an internal rib 5, defining a ring, which is shaped as an arc of circle having a radius R; comprised between 0 and 3 mm on its projection on a plane coplanar with the longitudinal axis Z.

The proximal side 3 has a slope 7 of angle $\alpha_2$ with a plane X perpendicular to the longitudinal axis Z, and the distal side 4 has a slope 8 of angle $\alpha_1$ with the plane X. For example, the plane X is the plane containing the medium point of the arc of circle of the internal rib 5.

The angle of aperture of the peripheral groove is indicated by α and is determined by the following equation:

$$\alpha = \alpha_1 + \alpha_2$$

where $\alpha_2 >$

As mentioned, the proximal 3 and distal 4 sides are straight; the proximal side has a length $d_1$, the distal side has a length $d_2$, and $d_2$ is smaller than $d_1$. Lengths $d_1$ and $d_2$ are the actual lengths of the straight sides, i.e. those indicated in FIG. 16. The depth of the peripheral groove, along a direction perpendicular to the longitudinal axis Z, is substantially determined by $d_2$ and $d_1$.

The proximal part 9 and the distal part 10 are connected, preferably directly, to a respective frustoconical portion of the body by a curved portion, which in FIG. 16 is shown as an arc of a circle. The curved portion between the distal part 10 and its respective frustoconical portion is indicated by reference numeral 6. The curved portion between the proximal part 9 and its respective frustoconical portion is indicated by reference numeral 6'. Preferably, the tangent, parallel to the longitudinal axis Z, to the curved portion 6' intersects the curved portion 6 or the distal straight side 4.

FIG. 15, which shows the collapsing of the bottle when an external compression force is applied centrally, for example at the neck 13, along the longitudinal axis Z. The original position, or conformation, of the bottle is indicated by reference numeral 1, solid line, and the final position, or conformation, is indicated by reference numeral 2, dashed line. By applying such a compression force, the peripheral groove 12 changes position and shape. In particular, in the final position 2, the peripheral groove 12 is collapsed on itself. With the application of an external force of about 90-130 N, preferably in function of the shape of inner rib 5, the proximal side 3 and the distal side 4 unite, i.e. contact each other, as shown in FIG. 1 with the reference 11. The application of an external compression force guarantees that the collapsing of the peripheral groove 12 is controlled. When the external force is progressively applied to the bottle, the collapsing sequence starts at the distal side 4 which flexes towards the base of the bottle inverting its original slope starting from an inversion point, with the inner rib 5 moving at a faster speed and reaching, at the end of the movement, the lowest allowed position, i.e. being at a height along the longitudinal axis Z which is more distant from the neck 13, with respect to its original position before the collapse. The proximal side 3 moves down, almost maintaining its shape and slope. Pushed by the proximal side 3, the curved portion 6 radially moves away from the longitudinal axis Z while reducing its curvature radius, with respect to its original position, and changing its shape in this way, as shown in FIG. 15 by reference numeral 56, in this way helping in giving more stability and rigidity to the bottle. The structure of the peripheral groove 12 and the applied force result in a snap action which provokes the sudden collapse of the groove gap which closes on itself, as shown by the final position 2, dashed line, in FIG. 15. Such a final position 2 is in stable equilibrium and only an external force, e.g. a traction force, can let the bottle assume its original position 1. The closing of the groove is achieved smoothly by the external force as a continuous downward movement, i.e. towards the base of the container, which goes from the original position 1 towards position 2, until the sudden collapse occurs. This collapse is typically irreversible and remains also after eliminating the axial load, i.e. the compression force. When the external compression force is applied, the groove collapses and disrupts the so-called "memory" of the polymer, which does not allow the groove to return to the original form without the intervention of another external force in the opposite direction, i.e. a traction force. It is obvious that if there is a pressure reduction within the bottle, the force which must be applied to re-obtain the original shape will be greater.

It is worth noting that it is advantageously possible to achieve an effective snap mechanism by virtue of straight sides adjacent to curved portions, as in the compressible bottle of the invention, e.g. the straight side 4 adjacent to the curved portion 6. Indeed, the curved portion 6, which in the conformation assumed in the final position 2 is indicated by reference numeral 56 (FIG. 1), exerts such a force on the united straight sides, reference numeral 11 in FIG. 1, that typically only a traction force can take the bottle back to its original position 1. Furthermore, because they are straight, these united straight sides 11, can withstand the force exerted by the curved portion indicated by reference numeral 56. It is also advantageous to have the curved portion 6' adjacent to the straight portion 3.

Figure 17:
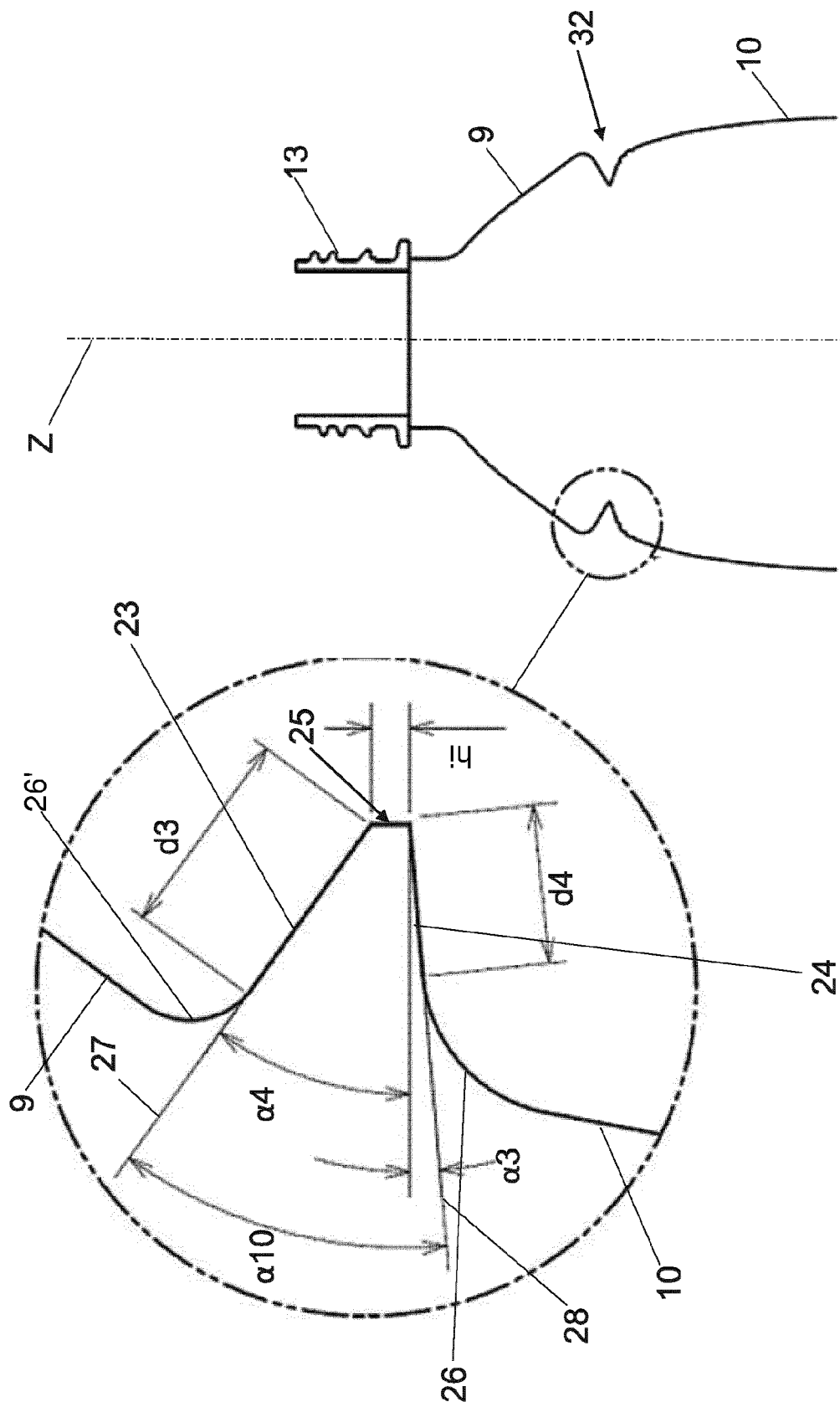
FIG. 17 shows a longitudinal section profile and an enlarged detail of part of another example of bottle.

Referring to FIG. 17, according to a second example, the bottle defines a longitudinal axis Z, and comprises a body having a neck 13 with an opening at one side, and a base, which closes the bottle and defines a base plane, opposite to the neck 13. The body has a part 9 proximal to the neck 13 and a part 10 distal from the neck 13. Between the proximal 9 and distal 10 parts, there are two substantially frustoconical portions of the body, having their smaller base opposed to each other. In other words, the larger base of the frustoconical portion, which is proximal to the neck 13, points towards the proximal part 9, and the larger base of the frustoconical portion, which is distal from the neck 13, points towards the distal part 10. In this manner, a peripheral groove 32 is formed, which in this example is a circumferential groove, having on its projection on a plane coplanar with the longitudinal axis Z a V-shaped profile, its apex 25 pointing towards the longitudinal axis Z. Preferably, the peripheral groove is located at the "shoulder" of the container, i.e. in the curved portion of the bottle which is proximal to its neck. The V-shaped profile has two straight sides, i.e. a first straight side 23 proximal to the neck 13, and a second straight side 24 distal from the neck 13. Therefore, the peripheral groove 32 is a gap having a length along the longitudinal axis Z which decreases from the external side of the bottle to the apex 25. In this example, the apex is an internal rib 25, defining a ring, which is shaped as a straight segment on its projection on a plane coplanar with the longitudinal axis Z of length $h_i$ comprised between 0 and 3 mm, conferring a cross section shape which resembles part of a trapezoid to the peripheral groove 32.

The proximal side 23 has a slope 27 of angle $\alpha_4$ with a plane X perpendicular to the longitudinal axis Z, and the distal side 24 has a slope 28 of angle $\alpha_3$ with the plane X.

The angle of aperture of the peripheral groove is indicated by $\alpha_{10}$ and is determined by the following equation:

$$\alpha_{10}=\alpha_3+\alpha_4$$

where $\alpha_4 > \alpha_3$

As mentioned, the proximal 23 and distal 24 sides are straight: the proximal side has a length $d_3$ and the distal side has a length $d_4$, and $d_4$ is smaller than $d_3$. Lengths $d_3$ and $d_4$ are the actual lengths of the straight sides, i.e. those indicated in FIG. 17. The depth of the peripheral groove, along a direction perpendicular to the longitudinal axis Z, is substantially determined by $d_4$ and $d_3$.

The proximal part 9 and the distal part 10 are connected, preferably directly, to a respective frustoconical portion of the body, by a curved portion, which in FIG. 16 is shown as an arc of a circle. The curved portion between the distal part 10 and its respective frustoconical portion is indicated by reference numeral 26. The curved portion between the proximal part 9 and its respective frustoconical portion is indicated by reference numeral 26'. Preferably, the tangent, parallel to the longitudinal axis Z, to the curved portion 26' intersects the curved portion 26 or the distal straight side 4.

The collapsing mechanism is substantially the same as in the first example of bottle.

Preferably, both in the first and second described example, the groove is located at a height h given by the expression:

$$h_{Tot}/2 < h < 4/5 h_{Tot}$$

where h indicates the height of the position of the peripheral groove measured from the base plane of the bottle and $h_{Tot}$ indicates the original total height of the bottle before the collapsing of the bottle because of the applied external force. Preferably, the peripheral groove is located between the neck and the portion of maximum diameter of the bottle.

Figure 18:
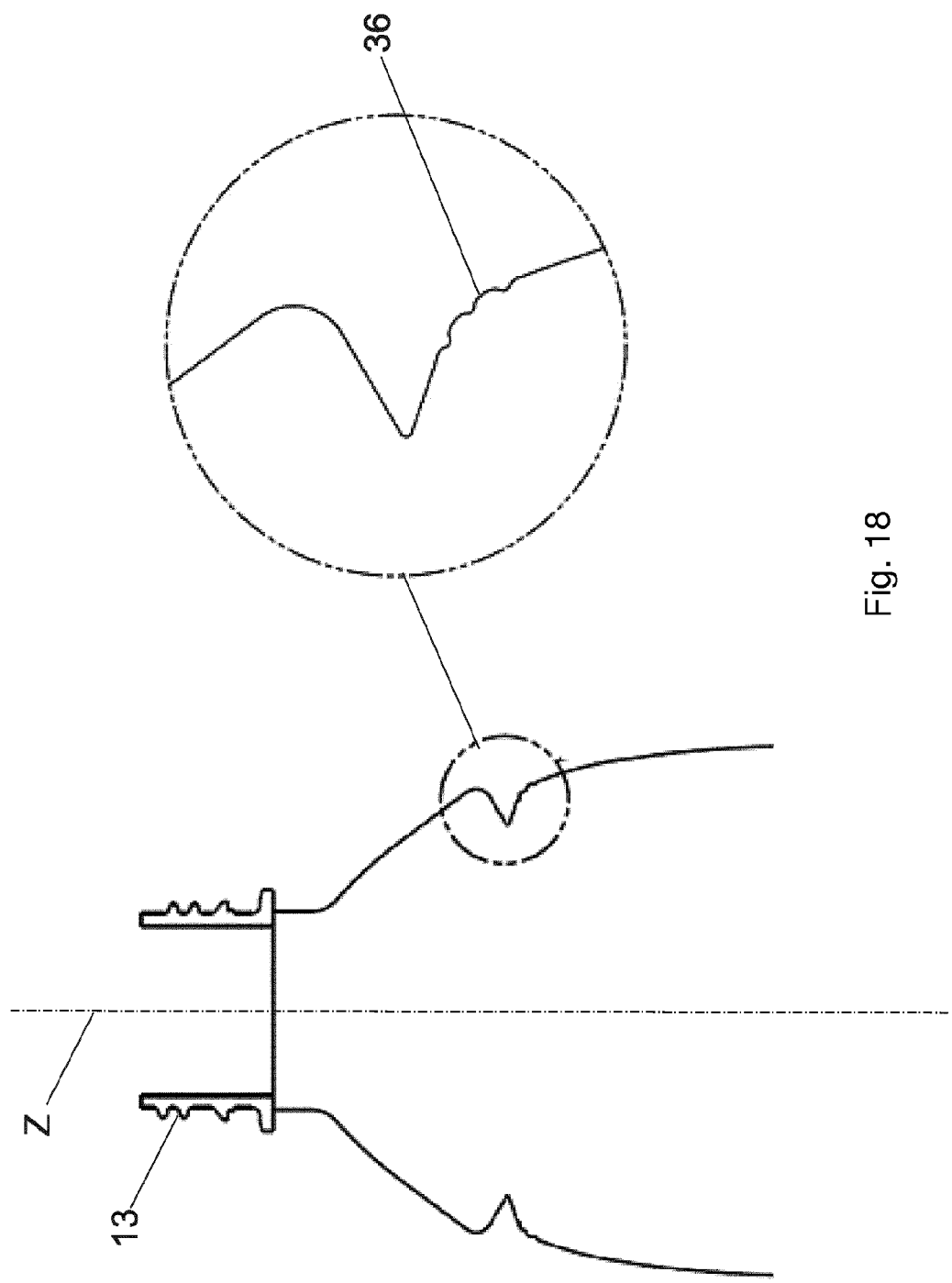
FIG. 18 shows a longitudinal section profile and an enlarged detail of part of a bottle according to an example.

Referring to FIG. 18 according to a variant of the first and second examples of bottle, the curved portion 36 connecting the distal part 10 to the frustoconical portion, is corrugated, in order to facilitate the collapsing of the peripheral groove starting from the distal side.

Figure 19:
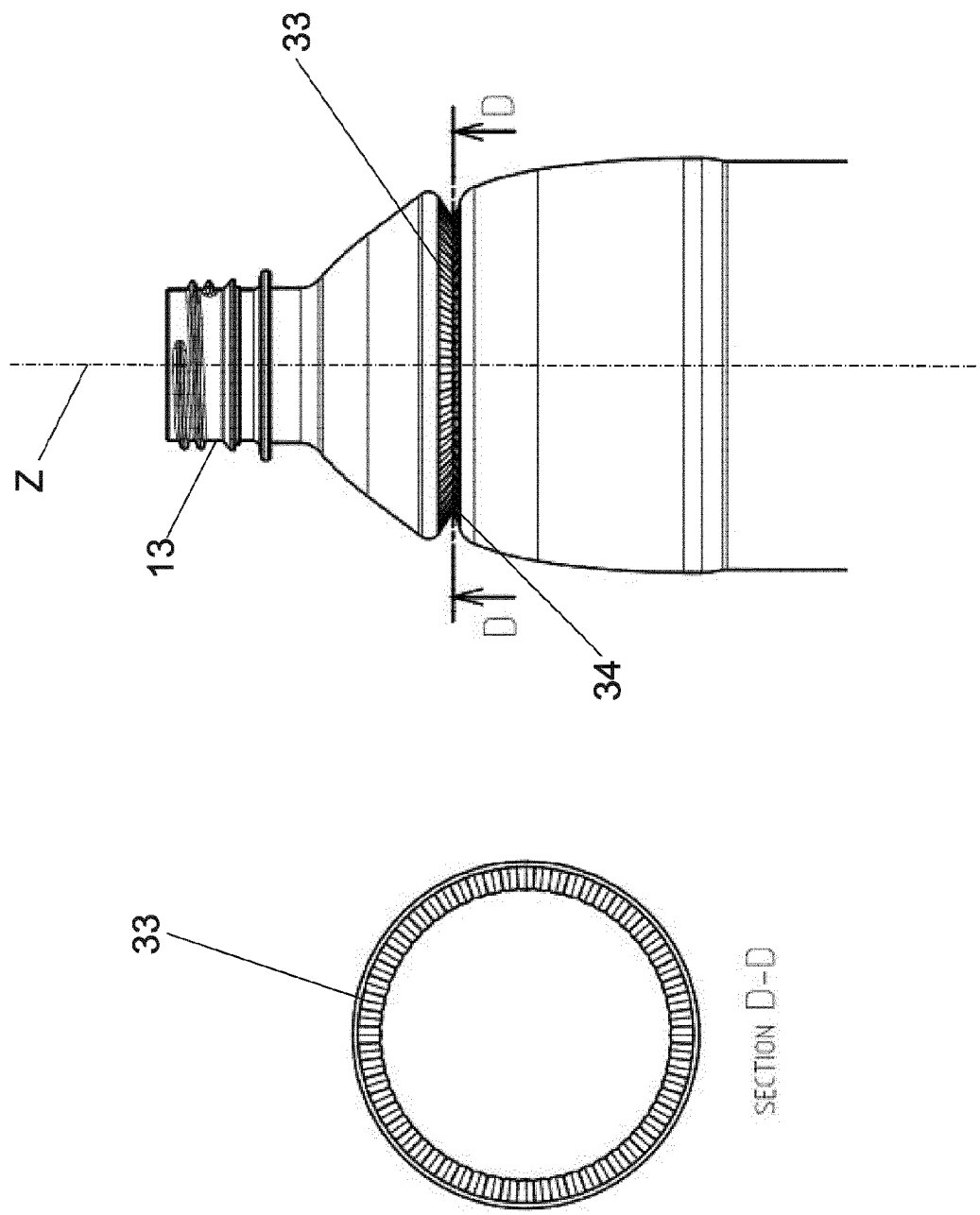
FIG. 19 shows a longitudinal section of part of a bottle and transversal section according to an example.

Referring to FIG. 19, according to a variant of the first and second embodiment, the proximal side 33 and the distal side 34 are knurled. For example, a plurality of protruding ribs can be provided, so that the surface of the proximal and straight side is substantially on dulated. The ribs of the proximal and of the distal side are straight and can mesh together.

Figure 20:
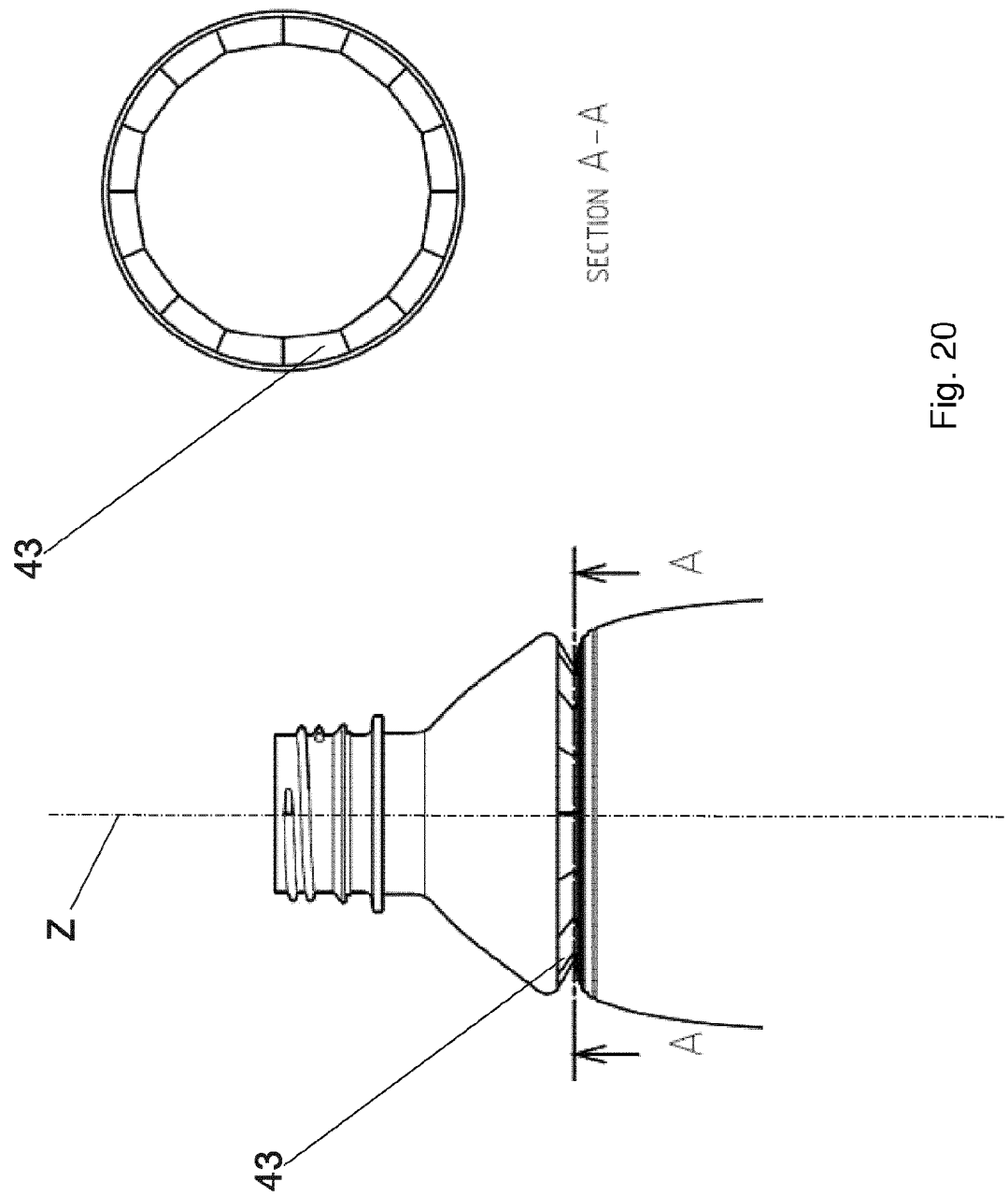
FIG. 20 shows a longitudinal section of part of a bottle and transversal section according to an example.

Referring to FIG. 20, according to a variant of the first and second examples of bottle, the proximal side 43 and the distal side are segmented. For example, a plurality of ribs can be provided, so that a plurality of substantially rectangular shaped zones are defined on the surface of the proximal and straight sides. Referring to FIG. 21, according to a variant of the first and second examples of bottle, the internal rib 42 of the peripheral groove, on its projection on a plane perpendicular to the longitudinal axis Z, is shaped as a wavy circle.

These different configurations, shown in FIGS. 19-21, help to confer a rigidity which necessitates an external force to achieve the collapsing of the bottle at the peripheral groove.

It is worth noting that the machine and apparatus of the invention can be used with other bottles provided with one or more peripheral grooves designed to collapse, or close, when a compression force is applied to the bottle.

The invention claimed is:

1. An apparatus for hot filling or warm filling a collapsible thermoplastic container,
    the apparatus comprising:
        a plurality of container stations including a blowing station, a filling station, a capping station, a tilting station, and a cooling tunnel arranged in a predetermined order to produce said collapsible thermoplastic container;
        a compression machine configured to apply an axial compression force to the collapsible thermoplastic container along a longitudinal axis thereof, said compression machine being positioned between the blowing station and the filling station, or between the filling station and the capping station, or after the cooling tunnel, or wherein the filling station includes the compression machine, or wherein the capping station includes the compression machine,
        wherein the collapsible thermoplastic container is configured for a hot filling or warm filling process at the plurality of container stations, the collapsible thermoplastic container comprising:
            a body provided with a shoulder,
            a neck having a circular upper end defining an opening at a first side of the body and a neck ring beneath the upper end,
            a base, defining a base plane at a second side of the body opposite to the first side, the body having a peripheral groove between the neck and an intermediate portion of the container along the longitudinal axis, the peripheral groove comprising a first side, proximal to the neck, and a second side, distal from the neck,
            wherein the first side is configured to come into contact with the second side to thereby reduce the internal volume of the container in response to the axial compression force being applied along the longitudinal axis; and
        wherein the compression machine comprises:
            at least one lower body having a surface for supporting the base of the collapsible thermoplastic container and at least one upper body configured to contact a portion of the collapsible thermoplastic container above the peripheral groove, wherein the collapsible thermoplastic container is held in an upright position by the at least one lower body and the at least one upper body,
            an actuator for selectively actuating the at least one lower body and/or the at least one upper body to apply said axial compression force which is sufficient to cause the first side to contact the second side of the peripheral groove of the container, such that the collapsible thermoplastic container has a reduced internal volume and overall height; and
            a cooling device including a spray nozzle arranged to cool the peripheral groove of the collapsible thermoplastic container.

2. The apparatus according to claim 1, wherein the compression machine is a rotary type arrangement that is configured to rotate about a rotational axis, the compression machine having a plurality of lower bodies and a plurality of upper bodies arranged in a circular pattern, wherein each upper body is substantially aligned with a respective lower body.

3. The apparatus according to claim 2, wherein the actuator includes at least one of a first actuator that sequentially lifts the lower bodies along a direction parallel to said rotation axis and a second actuator that sequentially lowers the upper bodies along said direction in order to apply said axial compression force.

4. The apparatus according to claim 3, wherein the at least one of the first and second actuators include a respective cam mechanism.

5. The apparatus according to claim 4, wherein each upper body of said plurality of upper bodies comprises a rod configured to contact the circular upper end of the collapsible thermoplastic container, or wherein each upper body of said plurality of upper bodies comprises a clamp positioned to contact the neck ring or the shoulder of the collapsible thermoplastic container in order to apply said axial compression force.

6. The apparatus according to claim 5 further comprising a support that maintains the upright position of the collapsible thermoplastic container when being compressed.

7. The apparatus according to claim 1, wherein said at least one lower body is a lower conveyor and said at least one upper body is a upper conveyor positioned above the lower conveyor, the lower conveyor and the upper conveyor defining, in use, an advancing direction for a plurality of collapsible thermoplastic containers.

8. The apparatus according to claim 7, wherein the upper conveyor includes a straight portion parallel to the lower conveyor, and an inclined portion positioned adjacent to and forward of said straight portion with respect to said advancing direction, said upper conveyor being configured so that a distance between the lower conveyor and the upper conveyor gradually decreases at the inclined portion to reach a minimum distance at the straight portion, wherein when a container reaches the straight portion said axial compression force is applied; and wherein the actuator includes at least one motor that drives the upper conveyor and the lower conveyor to convey the collapsible thermoplastic container in said advancing direction.

9. The apparatus according to claim 7, wherein said actuator lowers the upper conveyor along a direction substantially perpendicular to said advancing direction in order to apply said axial compression force simultaneously to a plurality of collapsible thermoplastic containers.

10. The apparatus according to claim 1, wherein said at least one lower body is one conveyor and said upper body comprises a rod having an end arranged to abut against the circular upper end of the collapsible thermoplastic container or against a cap of the collapsible thermoplastic container in order to apply said axial compression force.

11. The hot filling or warm filling process of collapsible thermoplastic containers by the apparatus according to claim 1, wherein said axial compression force is applied to one or more collapsible thermoplastic containers simultaneously or sequentially by the compression machine.

12. The hot filling or warm filling process of collapsible thermoplastic containers by the apparatus according to claim 1, wherein:
- a plurality of collapsible thermoplastic containers are produced by the blowing station;
- said axial compression force is applied to the plurality of collapsible thermoplastic containers simultaneously or sequentially by the compression machine; and
- the plurality of collapsible thermoplastic containers are filled by the filling station.

13. The hot filling or warm filling process of collapsible thermoplastic containers by the apparatus according to claim 1, wherein:
- a plurality of collapsible thermoplastic containers are produced by means of the blowing station;
- the plurality of collapsible thermoplastic containers are filled by the filling station;
- said axial compression force is applied to the plurality of collapsible thermoplastic containers simultaneously or sequentially by the compression machine; and
- capping the plurality of collapsible thermoplastic containers by the capping station.

14. The apparatus according to claim 1, wherein the actuator is a motor.

15. The apparatus according to claim 1, wherein the actuator includes a cam mechanism.

16. The apparatus according to claim 1, wherein said at least one lower body is one conveyor and said upper body comprises a clamp configured to contact the neck ring or the shoulder of the collapsible thermoplastic container in order to apply said axial compression force.

* * * * *